(12) United States Patent
Oguchi

(10) Patent No.: US 7,596,101 B2
(45) Date of Patent: Sep. 29, 2009

(54) DEVICE, NETWORK, AND SYSTEM FOR FORWARDING FRAMES BETWEEN GEOGRAPHICALLY DISPERSED USER NETWORKS

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 870 days.

(21) Appl. No.: 10/334,061

(22) Filed: Dec. 30, 2002

(65) Prior Publication Data
US 2003/0142680 A1    Jul. 31, 2003

(30) Foreign Application Priority Data
Jan. 28, 2002    (JP) .............. 2002-018236

(51) Int. Cl.
*H04L 12/28* (2006.01)
(52) U.S. Cl. ...................... 370/256; 370/400
(58) Field of Classification Search ...... 370/229–230.1, 370/235, 254–256, 389, 400–401, 422, 428
See application file for complete search history.

(56) References Cited

U.S. PATENT DOCUMENTS

| | | | |
|---|---|---|---|
| 6,535,490 B1* | 3/2003 | Jain ........................... | 370/256 |
| 6,628,624 B1* | 9/2003 | Mahajan et al. ............. | 370/256 |
| 6,795,403 B1* | 9/2004 | Gundavelli .................. | 370/256 |
| 6,912,589 B1* | 6/2005 | Jain et al. ................... | 709/238 |
| 6,937,576 B1* | 8/2005 | Di Benedetto et al. ....... | 370/256 |
| 6,944,159 B1* | 9/2005 | Fotedar et al. .............. | 370/392 |
| 6,963,575 B1* | 11/2005 | Sistanizadeh et al. ....... | 370/404 |
| 6,987,740 B1* | 1/2006 | Di Benedetto et al. ...... | 370/256 |
| 7,061,875 B1* | 6/2006 | Portolani et al. ........... | 370/256 |
| 7,145,878 B2* | 12/2006 | Katz .......................... | 370/238 |
| 7,177,946 B1* | 2/2007 | Kaluve et al. ............... | 709/242 |
| 2001/0030969 A1* | 10/2001 | Donaghey et al. ........... | 370/397 |
| 2005/0259597 A1* | 11/2005 | Benedetto et al. ........... | 370/254 |
| 2006/0233186 A1* | 10/2006 | Portolani et al. ............ | 370/408 |
| 2007/0124498 A1* | 5/2007 | Kaluve et al. ............... | 709/242 |

FOREIGN PATENT DOCUMENTS

JP    11-355337    12/1999

\* cited by examiner

*Primary Examiner*—Seema S Rao
*Assistant Examiner*—Xavier Szewai Wong
(74) *Attorney, Agent, or Firm*—Katten Muchin Rosenman LLP

(57) ABSTRACT

A frame forwarding system which has a plurality of frame forwarding devices and links to transport frames between external networks that belong to a particular group. This system is designed to prevent backbone links from being blocked even when there is a backdoor link that forms a potential loop in the network. A system state sharing unit in a frame forwarding device shares system state information with other frame forwarding devices. This information sharing enables all the frame forwarding devices and inter-node links to behave as a single virtual device for forwarding frames between external networks that belong to a particular group. A frame forwarding processor forwards received frames according to the system state information shared among all the frame forwarding devices in the system.

5 Claims, 32 Drawing Sheets

LOGICAL BRIDGE PARAMETERS

| | |
|---|---|
| Designated Root | |
| Root Path Cost | |
| Root Port | |
| Max Age | |
| Hello Time | |
| Forward Delay | |
| Bridge Identifier | |
| Bridge Max Age | |
| Bridge Hello Time | |
| Bridge Forward Delay | |
| Topology Change Detected | |
| Topology Change | |
| Topology Change Time | |
| Hold Time | |

FIG. 4

EXTERNAL NETWORK PORT MAPPING TABLE

| EXTERNAL NETWORK PORT | LOGICAL BRIDGE PORT NUMBER |
|---|---|
| | |
| | |
| | |

FIG. 5

LOGICAL BRIDGE PORT PARAMETERS

| Port Identifier | State | Path Cost | Designated Root | Designated Cost | Designated Bridge | Designated Port | Topology Change Acknowledge | Configuration Pending | Change Detection Enable |
|---|---|---|---|---|---|---|---|---|---|
| | | | | | | | | | |
| | | | | | | | | | |

| LOGICAL BRIDGE PORT NUMBER | PORT PARAMETERS |
|---|---|
| | |
| | |
| | |

FIG. 6

LOCAL PORT STATE DATABASE

| PORT NUMBER | CURRENT PORT STATE |
|---|---|
|  |  |
|  |  |
|  |  |

FIG. 7(A)

FORWARDING DATABASE

| MAC ADDRESS | PORT NUMBER |
|---|---|
|  |  |
|  |  |
|  |  |

FIG. 7(B)

| EXTERNAL NETWORK PORT | LOGICAL BRIDGE PORT |
|---|---|
| P11 | LP1 |

FIG. 8(A)

| EXTERNAL NETWORK PORT | LOGICAL BRIDGE PORT |
|---|---|
| P21 | LP2 |

FIG. 8(B)

| EXTERNAL NETWORK PORT | LOGICAL BRIDGE PORT |
|---|---|
| P31 | LP3 |

FIG. 8(C)

| EXTERNAL NETWORK PORT | LOGICAL BRIDGE PORT |
|---|---|
| P41 | LP4 |

FIG. 8(D)

| LOGICAL BRIDGE IDENTIFIER | 0x000000000000000F |

FIG. 9(A)

| LOGICAL BRIDGE PORT NUMBER | PORT IDENTIFIER |
|---|---|
| LP1 | 0x0001 |
| LP2 | 0x0002 |
| LP3 | 0x0003 |
| LP4 | 0x0004 |

FIG. 9(B)

POSSIBLE PORT STATES AND CORRESPONDING OPERATIONS

| PORT STATE | RECEIVED DATA FRAME | RECEIVED BPDU |
|---|---|---|
| Disabled | Discard | Discard |
| Blocking | Discard | Discard |
| Listening | Discard | Pass |
| Learning | Pass | Pass |
| Forwarding | Pass | Pass |

FIG. 14

INCOMING INTER-NODE CONNECTION PORT MAPPING TABLE

| INTER-NODE CONNECTION PORT | LOGICAL BRIDGE PORT NUMBER |
|---|---|
| P13 | LP3 |
| P14 | LP4 |
| P18 | LP5 |
| P17 | LP6 |
| P16 | LP7 |
| P15 | LP8 |

FIG. 19

OUTGOING INTER-NODE CONNECTION PORT MAPPING TABLE

| LOGICAL BRIDGE PORT NUMBER | INTER-NODE CONNECTION PORT |
|---|---|
| LP1 | P13 |
| LP1 | P15 |
| LP1 | P17 |
| LP2 | P14 |
| LP2 | P18 |
| LP2 | P16 |

FIG. 20

INTER-NODE CONNECTION PORT MAPPING TABLE

| INTER-NODE CONNECTION PORT | LOGICAL BRIDGE PORT NUMBER |
|---|---|
| P52 | LP1 |
| P53 | LP2 |
| P55 | LP3 |
| P56 | LP4 |
| P61 | LP5 |
| P60 | LP6 |
| P58 | LP7 |
| P57 | LP8 |

FIG. 25

CONTROL MESSAGE PORT MAPPING TABLE

| LOGICAL BRIDGE PORT NUMBER | INTER-NODE CONNECTION PORT (FOR TRANSMITTING PORT CONTROL MESSAGES) |
|---|---|
| LP1 | P51 |
| LP2 | P51 |
| LP3 | P54 |
| LP4 | P54 |
| LP5 | P62 |
| LP6 | P62 |
| LP7 | P59 |
| LP8 | P59 |

FIG. 26

DEVICE, NETWORK, AND SYSTEM FOR FORWARDING FRAMES BETWEEN GEOGRAPHICALLY DISPERSED USER NETWORKS

BACKGROUND OF THE INVENTION

1. Field of the Invention

The present invention relates to a device, network, and system for forwarding frames between geographically dispersed user networks. More particularly, the present invention relates to a frame forwarding system which employs a plurality of devices and links to transport frames between external user networks that belong to a particular group. The present invention also relates to the devices and network involved in that system.

2. Description of the Related Art

Many companies have an enterprise network for communication between their geographically dispersed business units through the use of wide area network (WAN) connections. To support construction of such networks, Internet service providers and telecommunications carriers (collectively, WAN providers) are offering virtual private network (VPN) services on their backbone network, permitting a group of external user networks to use a part of the bandwidth of their backbone transport. With VPN facilities, a company can build their own intranet environment by interconnecting local area networks (LANs) located in distant sites. The present invention assumes the presence of an intermediary network system with VPN services, for example, which provides transparent connection between such LAN segments in a company. In this system, LANs in geographically dispersed user sites are attached to a WAN provider's backbone system as its external networks.

FIG. 30 illustrates the relationship between a backbone network and its external networks. Here, the backbone network refers to a network operated by a WAN provider, which provides users with wide area networking services. External networks, on the other hand, are user networks (e.g., company LANs) which are located at different user sites and attached to different edge devices of the backbone network.

More specifically, in the example network system of FIG. 30, a plurality of user networks (LAN segments) 14 to 16 are coupled to a carrier network 10 that a telecommunications carrier offers. The carrier network 10 includes carrier nodes 11 to 13 which transport packets between the user networks 14 to 16 attached to them. Here, the carrier network 10 serves as a VPN backbone that interconnects the user networks 14 to 16 as its external networks. From the user's point of view, the carrier network 10 functions as a transparent bridge, or a transparent bridge network which consists of bridges.

The user networks 14 to 16 are geographically dispersed LAN segments, being bridged to the carrier network 10 through their nearest carrier nodes 11 to 13. An end station 17 is a piece of equipment based on a personal computer or other similar platform, which communicates with other stations (not shown) via the user network 14. Besides using VPN service over the carrier network 10, the user network 14 also has a backdoor link 18 to reach the remote user network 16. This backdoor link 18 is a temporary connection established on, for example, a separate telecommunication circuit for maintenance purposes.

The backdoor link 18, when added, creates a closed loop within the system of FIG. 30 because it runs in parallel with an existing network path between the user networks 14 and 16. When a certain node flooded a packet out all ports in such a loop situation, broadcast packets would be generated endlessly, thus causing a problem known as a "broadcast storm." Since the looping traffic overwhelms the network capacity, the broadcast storm substantially blocks other packet traffic on the network.

To avoid the above problem, conventional network nodes are designed to detect and block a potential loop path, using a method known as the spanning tree protocol (STP). This protocol creates a stable loop-free tree structure on any given physical topology, thus preventing packets from circulating endlessly. Specifically, the spanning tree algorithm uses the priorities assigned to individual bridges and their ports to determine which links should be used when there are multiple paths between bridges. By pruning redundant links with low priorities, the algorithm configures a loop-free logical network topology (called "spanning tree topology") where a single network node is designated as the root bridge, and all other nodes are arranged in subtrees below that bridge.

To determine an appropriate logical topology with STP, all bridges in both the carrier network and user networks have to be involved in the spanning tree algorithm processing. For this reason, every node within a carrier network acts as a bridge that transmits and receives control messages called "STP Bridge Protocol Data Unit" (BPDU), and the inter-node links carry them from node to node. A more specific discussion follows below.

FIG. 31 shows an example of an intranet where three user networks 23 to 25 are interconnected with VPN services on a WAN provider's backbone network. As can be seen in FIG. 31, STP BPDUs are sent over a carrier network, which is now working as bridge-to-bridge links to connect between three carrier nodes 20 to 22. With STP BPDUs, the carrier nodes 20 to 22 manage the state of individual ports that accommodate those links. Here, the carrier nodes 20 to 22 each function as a bridge to serve user networks 23 to 25, which are attached to the remaining ports of them. Every link within the carrier network serves as an independent link to connect those nodes together. The spanning tree algorithm transmits and receives STP BPDUs on every port of the nodes in order to determine to which state they should be set. This means that the spanning tree topology involves all individual inter-node links within the carrier network.

As another example, FIG. 32 shows a conventional LAN emulation system where STP BPDUs are sent over an asynchronous transmission mode (ATM) backbone. The illustrated system includes an ATM network 30 which offers virtual connection-oriented service with cell switching techniques. This network 30 transports user data at high bitrates in the form of cells with VPI/VCI in their header field, over communication paths previously established between ATM devices by using hierarchically structured ATM addresses.

The ATM network 30 provides an emulated LAN (ELAN) with its fully meshed connectivity, which permits LAN emulation clients (LECs) 31 to 33 to broadcast packets. Each node has an ELAN connection port and manages the state of that port. LECs set up a point-to-point Control Direct VCC (virtual channel connection) and a point-to-multipoint Control Distribute VCC to the LAN emulation server (LES) when they initially join a particular emulated LAN. The LES offers central directory service of an emulated LAN, to which a LEC can turn to look up the ATM address of another LEC if it is unknown. When sending data to a new destination, the source LEC uses its Control Direct VCC to request LES to resolve the destination ATM address. The LES then returns the requested address to the source LEC through a relevant Control Distribute VCC, thus enabling the source LEC to set up a Data Direct VCC to the destination LEC.

In one aspect of the above-described ELAN environment, the LECs 31 to 33 function as bridges placed at the nodes of a carrier network having fully meshed links to convey broadcast traffic. Each node uses STP to manage its port accommodating a user network, as well as ports for node-to-node connections. Here, the internal topology of the carrier network will be treated as part of the spanning tree topology of a single broadcast network.

The carrier network, however, is primarily a private network that is owned and controlled by a telecommunications carrier, independently of user networks. The carrier naturally desires to control the logical topology of their own network so as to make efficient use of available resources. This desire is, however, not necessarily satisfied because the spanning tree algorithm may affect the internal configuration of a carrier network when it is a bridge network. Also in the case of ATM LAN emulation, the connectivity between LECs and ELAN is influenced by STP processing on the user side.

Further, referring back to the conventional bridge network discussed in FIGS. 30 and 31, it is the spanning tree algorithm that determines which inter-node links to use in defining loop-free logical paths. Even if there is a shorter way to go, the algorithm may take another path that is physically longer. For this reason, the resulting logical paths within the carrier network may not necessarily be efficient. If this is the case, the network traffic would concentrate into particular bridge devices and links that are near the root of the spanning tree, thus causing a load imbalance among the resources in the carrier network.

In the case of LAN emulation discussed in FIG. 32, each carrier node determines its ELAN port state according to STP BPDUs sent from a user network, and this means that the carrier is not allowed to control their network's internal configuration at their discretion. Normally, the carrier network nodes are given a higher STP priority, so that external networks be connected primarily through the carrier network. It is still possible, however, that a combination of some high-priority nodes and a backdoor link would accidentally supercede high-speed connection paths within the carrier network, resulting in a poor logical topology that detours around it.

SUMMARY OF THE INVENTION

In view of the foregoing, it is an object of the present invention to provide a frame forwarding system, a frame forwarding device, and a network system which accepts a carrier's privilege in controlling the topology of their own carrier network, so as to efficiently operate the carrier network, ensuring the use of the physically shortest links in it.

To accomplish the above object, according to the present invention, there is provided a frame forwarding system. This system comprises the following elements: a plurality of frame forwarding devices that transport frames between external networks that belong to the same group; a plurality of links that interconnect the plurality of frame forwarding devices; a system state sharing unit, disposed in each frame forwarding device, which shares system state information with other frame forwarding devices, whereby the frame forwarding devices and the links behave as a single virtual device for forwarding frames between the external networks; a frame forwarding processor, disposed in each frame forwarding device, which forwards received frames according to the system state information shared among all the frame forwarding devices; and a system state updating unit, disposed in each frame forwarding device, which updates the system state information managed in the system state sharing unit when a given STP BPDU necessitates a change in the system state information.

Also, to accomplish the above object, the present invention provides a frame forwarding device for use as a node in a frame forwarding system which has a plurality of nodes and links to transport frames between external networks that belong to the same group. This frame forwarding device comprises the following elements: a system state sharing unit which shares system state information with other nodes in the frame forwarding system, whereby the nodes and links behave as a single virtual device for forwarding frames between the external networks; and a frame forwarding unit which forwards received frames according to the system state information shared among all the nodes in the frame forwarding system.

Further, to accomplish the above object, the present invention provides an edge network device on an intermediary network that interconnects a plurality of LAN segments to form a network system. This device comprises a frame forwarding function to forward an incoming frame to other network devices on the intermediary network, when it contains information for detecting a physical loop on the network system and avoiding loop traffic on the physical loop. The network device also has a loop prevention function which prevents a logical loop from being formed on the physical loop, while ensuring the use of logical paths on the intermediary network, based on the information contained in the incoming frame and parameters that characterize the intermediary network as a single virtual bridge device.

Moreover, to accomplish the above object, the present invention provides a network system comprising a plurality of LAN segments and an intermediary network that interconnects the LAN segments. The network system has a virtual bridging mechanism which makes the intermediary network work as a single bridge device. It also employs a loop prevention function which prevents a logical loop from being formed on a physical loop in the network system, while ensuring the use of logical paths on the intermediary network.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows logical bridge parameters;
FIG. 5 shows a table representing external network ports and their associated logical bridge port numbers;
FIG. 6 shows logical bridge port parameters;
FIG. 7(A) shows a local port state database;
FIG. 7(B) shows a forwarding database;
FIGS. 8(A), 8(B), 8(C), and 8(D) show examples of initial setup values for an external network port mapping table that associates external network ports with logical bridge ports on each node;
FIG. 9(A) shows a logical bridge identifier;
FIG. 9(B) shows an example of initial setup for logical bridge port identifiers.

FIG. 14 shows an example of data stored in a local port state database;

FIG. 19 is a table representing inter-node connection ports of a node and their associated logical bridge ports on another node;

FIG. 20 is a table for a node to determine which inter-node connection port should be used to forward a BPDU to another node, when it is received on a specific logical bridge port;

FIG. 25 shows a table representing the association between inter-node connection ports on a server and logical bridge ports on other nodes;

FIG. 26 shows a table representing logical bridge ports and their associated inter-node connection ports, which enables a server to determine on which port a port control message should be sent to an intended node, when changing the state of a particular logical bridge port on that node;

DESCRIPTION OF THE PREFERRED EMBODIMENTS

Figure 1:
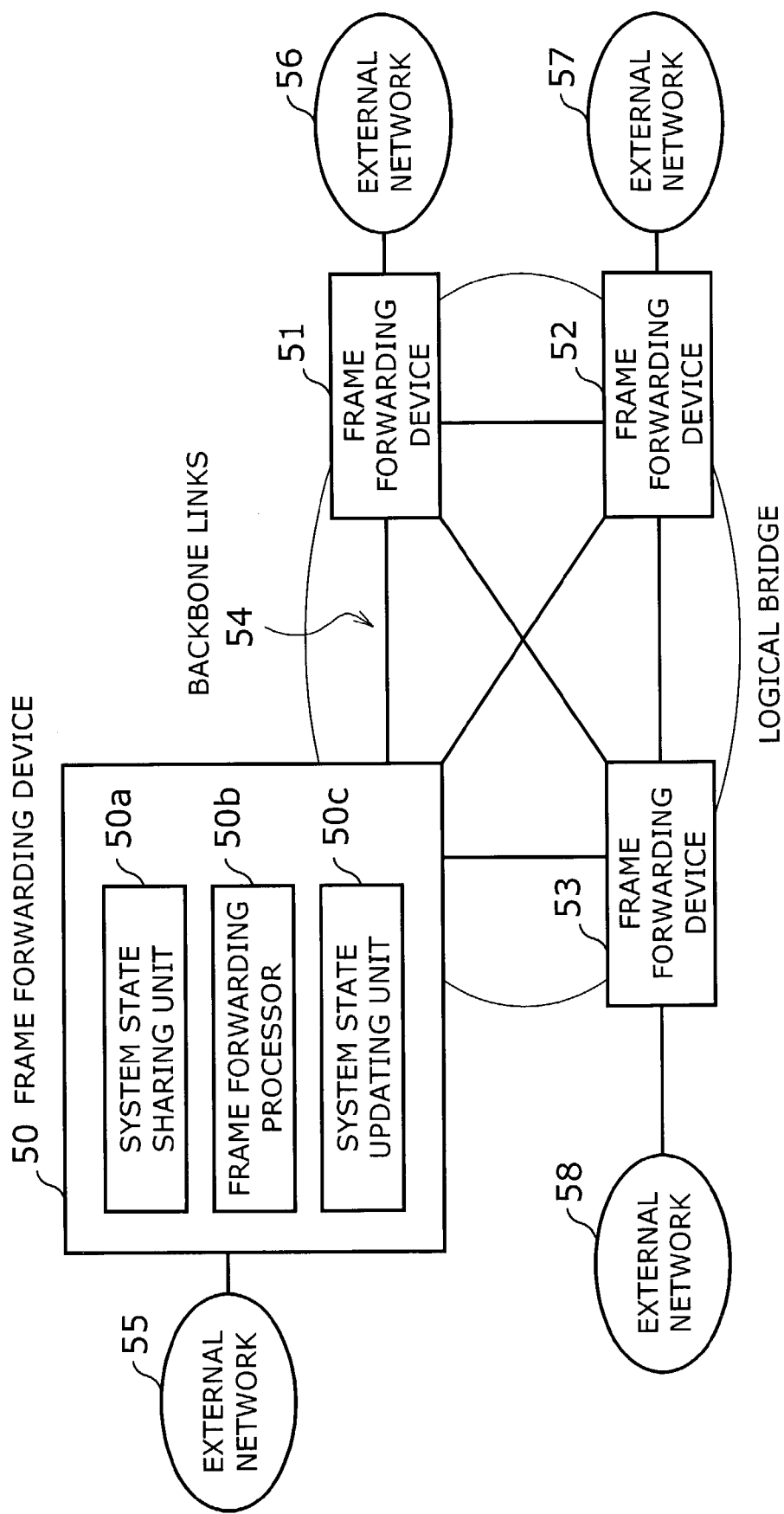
FIG. 1 is a conceptual view of the present invention.

Preferred embodiments of the present invention will be described below with reference to the accompanying drawings, wherein like reference numerals refer to like elements throughout.

FIG. 1 is a conceptual view of a frame forwarding system according to the present invention. The illustrated system includes a plurality of frame forwarding devices 50 to 53, backbone links 54, and external networks 55 to 58. The frame forwarding devices 50 to 53 forward each received frame toward its destinations when it comes from the external network 55 to 58 that they are serving or from a peer frame forwarding device.

FIG. 1 also shows some details of the frame forwarding device 50, which include: a system state sharing unit 50a, a frame forwarding processor 50b, and a system state updating unit 50c. The system state sharing unit 50a enables all frame forwarding devices 50 to 53 accommodating a specific group of external networks 55 to 58 to share the information about the frame forwarding system's state and configuration (referred to hereafter as the "system state information"). By sharing the system state information, those frame forwarding devices 55 to 58, in conjunction with their associated backbone links 54, will act as a single virtual frame forwarding device ("logical bridge" to be described later). The frame forwarding processor 50b relays frames according to the system state information provided by the system state sharing unit 50a. The system state updating unit 50c updates the system state information when a given STP BPDU necessitates a change in the system state information being shared. Note that the above three functional elements are employed also in the other frame forwarding devices 51 to 53.

The above system operates as follows. The system state sharing unit 50a communicates with other frame forwarding devices 51 to 53 to share the system state information, which includes port parameters, bridge parameters, and port state information. When an STP BPDU is received from a client connected to, for example, the external network 55, the system state updating unit 50c updates the system state information according to the spanning tree algorithm. The system state updating unit 50c also delivers that update to the other frame forwarding devices 51 to 53 to ensure that the same change always takes place in every peer unit. With this update message, the remaining frame forwarding devices 51 to 53 change their local copy of the system state information in the same way, thus maintaining the information in a consistent state. The frame forwarding processor 50b transfers incoming frames to their destinations according to the updated system state information.

The proposed system permits all frame forwarding devices to share the same set of system state information for use in their frame forwarding operation, serving the users on the external networks 55 to 58. When viewed from the standpoint of those users, the system as a whole appears to be functioning as a single frame forwarding device, whereas it is actually composed of a plurality of such devices. Because of their apparent unity, the individual backbone links 54 will not be affected by any STP BPDUs sent from external user networks. Suppose, for example, that a backdoor link is added to directly connect two external networks 55 and 56. With STP BPDUs issued from a user network, the spanning tree algorithm detects a potential loop in the network and thus blocks the relevant port of the external network 55, not to use the backdoor link in forwarding data frames from there. None of the backbone links 54 are, however, blocked by those STP BPDUs, and the network system can therefore maintain its performance as a whole.

As described above, the present invention permits a plurality of frame forwarding devices to act as if it were a single unified bridge; hence it is called a "logical bridge." This logical bridge is, in other words, a virtual bridge within which all the involved frame forwarding devices 50 to 53 cooperate in a distributed manner, using their internal backbone links 54. Just as an ordinary bridge device has its ports to interface with user networks, and its internal paths to transport frames from port to port, the logical bridge of the present invention has its own logical bridge ports and logical bridge paths. More specifically, the logical bridge ports are those ports that the frame forwarding devices 50 to 53 provide in order to interface with their respective external networks 55 to 58, and the backbone links 54 serve as the internal paths between those logical bridge ports. The frame forwarding devices 51 to 53 execute an address learning process in a distributed fashion, using an address learning table stored therein. As the first step of frame bridging, this process establishes a map of end stations that are attached to the network.

As mentioned earlier, the system state information managed in the system state sharing unit 50*a* includes port parameters, bridge parameters, and other data related to the logical bridge. When a frame forwarding device receives an STP BPDU from a user network, its local system state updating unit 50*c* updates its local copy of system state information with the received STP BPDU, besides changing the state of a logical bridge port according to the new system configuration.

Before moving into a more specific method to make the above frame-forwarding bridge units operate as a single logical bridge, the following section briefly discusses major functions that bridges generally have. They are: frame forwarding, address learning, and loop prevention. The specifics of those three functions are as follows.

(1) Frame Forwarding Function: By definition, every bridge performs frame forwarding in the following way. Upon receipt of a frame on an enabled port, the bridge consults its local forwarding database to find an entry that has the received frame's destination address, thereby determining on which port the frame should be forwarded. If there is no match in the database, the bridge broadcasts the frame onto all ports except the port from which it was received, so that the frame will be flooded on all other network segments that are attached to the bridge. In this case, the bridge also stores address information of that frame for use in later routing operation. If, on the other hand, there is a match in the database, then the bridge compares the destination port found in that matched entry with the source port that initially received the frame. In the case those two ports disagree, the bridge retransmits the frame through that destination port, thereby forwarding the frame to the next network segment. If the two ports are found identical, then the bridge discards the frame and resets the corresponding entry in the forwarding database, so as to relearn a correct destination port.

(2) Address Learning Function: Bridges learn addresses by listening on a port for a device's source Media Access Control (MAC) address each time a frame is received. The source MAC address and corresponding receiving port are registered with each bridge's own forwarding database. This address/port information aids the bridge later in determining on which port it should forward a frame, when a specific destination MAC address is given. To be more specific about the address learning function, the bridge processor consults its forwarding database each time a frame is received, in an attempt to determine whether the source address of that frame is registered. If the frame's source address is already in the database, the bridge processor resets the aging timer for that entry. If the frame's source address is not registered, then that address is added to the database, together with its receiving port identifier.

(3) Loop Prevention Function: This is also referred to as the port state management function. Actually, bridges use the spanning tree algorithm to establish a loop-free spanning tree topology in a redundant network. Each bridge on a network enables or disables their ports to create appropriate logical data paths as part of the spanning tree, by exchanging STP BPDUs with other bridges and comparing its own priority level with others'. To make the spanning tree algorithm work, the following premises must hold:

(A) Every bridge on a network has a globally unique identifier.

(B) There is a special group address for all bridges.

(C) Each port on a bridge has an identifier that is unique within that bridge.

The spanning tree algorithm first elects a "root bridge." The root bridge broadcasts a BPDU to other bridges at regular intervals, asserting that it is the root. Initially, every bridge believes itself to be the root bridge, and thus all bridges send out BPDUs with their configuration data, including the root identifier equal to their own bridge identifier. In the election process, the bridge identifier values are interpreted as priority levels of bridges. When a bridge identifies itself as a lower priority bridge, it drops from the election race and designates its "root port" as the one on which it is receiving BPDUs with the lowest path cost. When a BPDU arrives on its root port, a non-root bridge places the BPDU on other ports, thereby forwarding them to the LAN segments that it is serving as their "designated bridge."

By exchanging such BPDU messages containing a bridge identifier, the bridges determine which should be the root bridge with the highest priority. Each non-root bridge has its own root port determined by comparing the path costs and port identifiers, which offers the nearest way to the root bridge with a minimum path cost. The non-root bridges then send their own configuration BPDU message out all ports other than the root port, so as to determine whether they should serve as the designated bridge of a LAN segment to which they are connected.

According to the present invention, a plurality of frame forwarding devices work together as a single logical bridge to provide the above functions. The logical bridge is a virtual device within which all carrier nodes cooperate in a distributed manner, using their internal backbone links. Its edge ports, or the ports to which user networks are attached, are referred to as "logical bridge ports." Inter-node links within the carrier network provide internal data paths between those logical bridge ports. For frame forwarding, each node in the logical bridge learns user device addresses on a distributed basis, storing the information in its local learning table. The logical bridge also manages its own port parameters and bridge parameters to configure itself as a virtual bridge device. When a particular node receives an STP BPDU from a user network, the logical bridge updates those parameters with the received STP BPDU and configures a corresponding node to change the state of a logical bridge port as specified.

There are two ways to interconnect multiple user networks: one is by using a single multi-port bridge, and the other is by using a plurality of bridges and links. Transparent bridges, by definition, hide the lower-level structure of a LAN system that is actually composed of a plurality of physically separate segments. That is, transparent bridges permit those LAN segments to behave as if they were a single unified network when viewed from upper-level protocols above the data link layer. Accordingly, user networks would see no difference between the two connection methods mentioned above, as long as there are no inter-node loops within the bridge network. That explains why a loop-free network of transparent bridges can be regarded as a single logical bridge.

Figure 2:
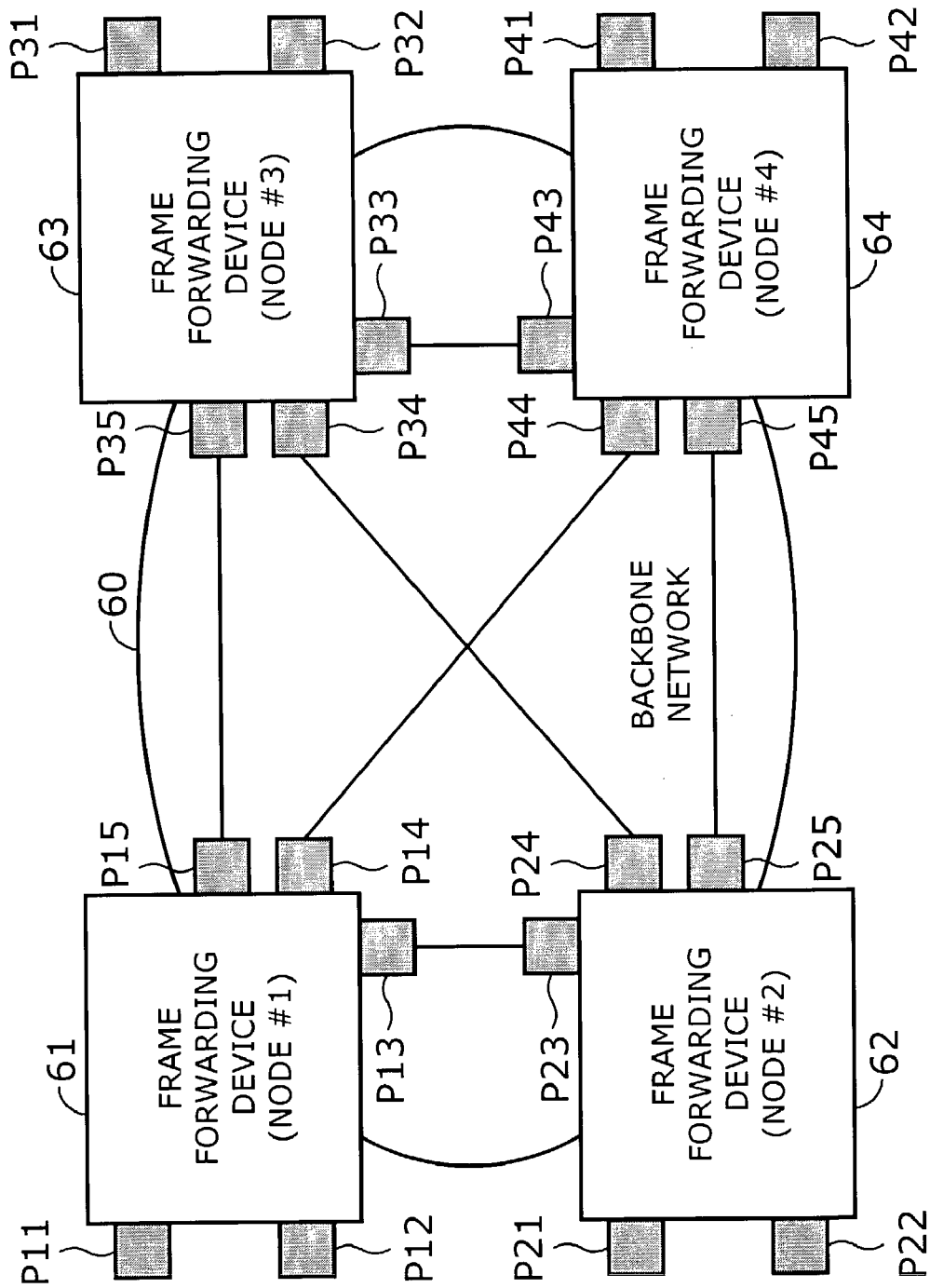
FIG. 2 shows a typical network system according to a first embodiment of the present invention.

Referring now to FIG. 2, a frame forwarding system according to a first embodiment of the present invention will be described below. FIG. 2 is a block diagram of a frame forwarding system, which involves a plurality of nodes, or frame forwarding devices 61 to 64, and a backbone network 60 interconnecting them. The backbone network 60 conveys packets between external networks that belong to a particular group, and the frame forwarding devices 61 to 64 have packet forwarding functions and spanning tree algorithm processing functions.

The edge nodes in the illustrated system have physical or logical ports to send and receive data frames to/from external networks (not shown). These ports are referred to as "external network ports," and their individual port state is managed by the spanning tree algorithm. The remaining ports, on the other hand, are called "inter-node connection ports," which are used to transfer data frames from one node to another within a logical bridge. That is, data frames received on an external network port are forwarded to another node out an inter-node connection port. Each node has one or more such inter-node connection ports to ensure the connectivity to other nodes. The number of such ports depends on the design of the backbone network 60.

Figure 3:
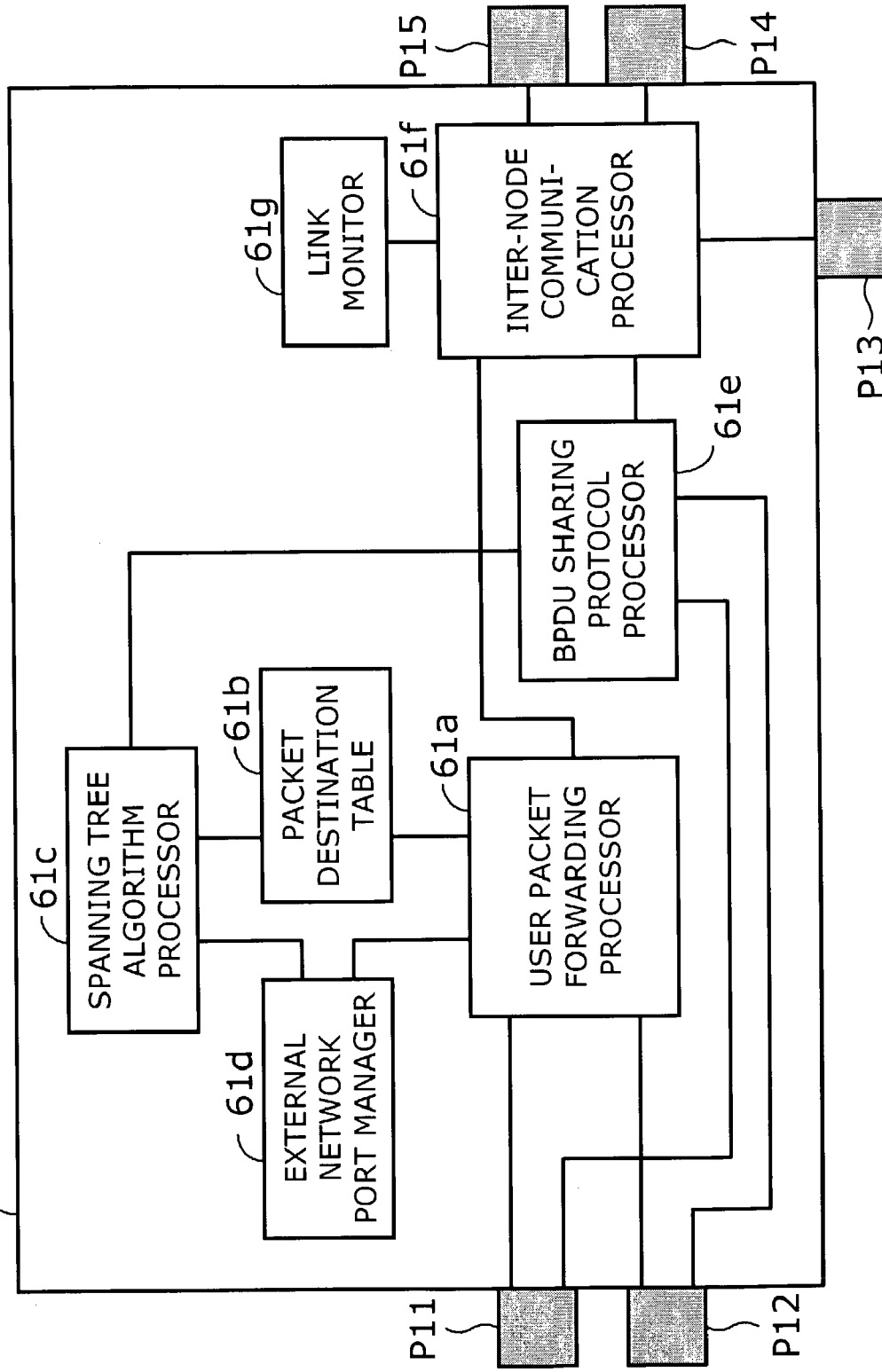
FIG. 3 gives details of a frame forwarding device shown in FIG. 2.

FIG. 3 gives details of the frame forwarding device 61 shown in FIG. 2. As can be seen from this block diagram, the frame forwarding device 61 has the following functional elements: a user packet forwarding processor 61a, a packet destination table 61b, a spanning tree algorithm processor 61c, an external network port manager 61d, a BPDU sharing protocol processor 61e, an inter-node communication processor 61f, a link monitor 61g, and ports P11 to P15.

The user packet forwarding processor 61a receives packets from user networks and forwards them out relevant ports according to their destination address field values. The packet destination table 61b is a table used to determine to which port each received packet should be directed. The spanning tree algorithm processor 61c determines the state of each external network ports, based on BPDUs received from the node's own external network ports, or based on the network topology configuration data that other nodes have received, so that all edge nodes serving a specific group of external networks, together with their associated backbone facilities, will behave as a single bridge node. The spanning tree algorithm processor 61c also issues its own STP BPDUs containing network topology configuration data.

The external network port manager 61d manages the current state of every external network port on the node. The BPDU sharing protocol processor 61e, on the other hand, exchanges protocol messages with other nodes to provide them with network topology configuration data contained in BPDU messages. The inter-node communication processor 61f is responsible for practical tasks of node-to-node message transmission and reception. The link monitor 61g watches the condition of each link, in an attempt to detect a connectivity problem.

The illustrated frame forwarding device 61 has five ports, which include: two external network ports P11 and P12 to interface with external networks (user networks), and three inter-node connection ports P13 to P15 to interface with other nodes on the backbone network 60.

According to the present embodiment of the invention, each frame forwarding device 61 to 64 stores the following tables and parameters:

(1) logical bridge parameters
(2) external network port mapping table
(3) logical bridge port parameters
(4) local port state database
(5) forwarding database where the local port state database (4) and forwarding database (5) are tables that are similar to what ordinary bridges have.

Referring to FIG. 4, the logical bridge parameters (1) are shown. They are a set of key parameters that conform to ANSI/IEEE 802.1D, which is commonly used as the standard specifications for bridges. For the definition and usage of each parameter item, refer to existing standard documents. It should be noted, however, that the parameters shown in FIG. 4 are not of individual nodes, but of a logical bridge that is composed of all carrier nodes serving a particular group of external networks. In other words, the logical bridge parameters are shared by all nodes that are involved.

The network administrator assigns a specific bridge identifier to the logical bridge before starting it. About the other parameters, he/she may rely on standard default values recommended in the ANSI/IEEE 802.1D specifications. Another option is to let the spanning tree algorithm determine them.

Referring to FIG. 5, an example of the external network port mapping table (2) is shown, which defines the association between external network ports and logical bridge ports. Note that the former ports belong to individual nodes, while the latter ports are of the logical bridge that involves all nodes. When a BPDU is received from a user network, the receiving node regards it as a BPDU message that the logical bridge has received on one of its logical ports. Here, the external network port mapping table enables the node to identify on which logical bridge port the BPDU has been received. More specifically, the node first obtains a local bridge port number representing the external network port from which the BPDU came, and then translates it to a logical bridge port number, consulting the external network port mapping table.

Before starting up the logical bridge, the network administrator has to set up the external network port mapping table, using an operator console of each node. If available, a centralized network management tool aids him/her to edit tables on remote nodes.

Referring to FIG. 6, the logical bridge port parameters (3) are shown in table form, representing the detailed profile of individual logical bridge ports. Each node identifies the network topology with the spanning tree algorithm, examining BPDUs that the logical bridge receives from user networks or inter-node control messages (described later) that are sent from other nodes. Particularly, the spanning tree algorithm determines whether to enable or block each logical bridge port, based on the configuration management data contained in a received BPDU or inter-node control message. The parameter table shown in FIG. 6 is used by the nodes to store such port state information, together with other port parameters obtained through the above topology discovery process. For the definition and usage of each parameter item, refer to the ANSI/IEEE 802.1D standard specifications.

Referring to FIG. 7(A), an example of the local port state database (4) is shown, which records the condition of each node's local ports. The nodes modifies this database to map the logical bridge port states onto their local port states when they act as part of the logical bridge. This mapping is necessary to control transport of BPDUs and data frames on their local ports.

As already explained earlier, local ports of a node are divided into two groups: external network ports and inter-node connection ports. According to the present embodiment, the inter-node connection ports are divided into control ports and forwarding ports. The nodes solely subject their external network ports to spanning tree algorithm processing when they are functioning as the logical bridge. In this operating mode, their inter-node connection ports are set to the "forwarding state" (the normal state of a port in which frames can be transmitted and received on the port) as long as their corresponding inter-node links are working.

The nodes determine the states of logical bridge ports and update them if necessary, each time a BPDU is received from a user network, or each time an inter-node control message is received from other nodes. Further, each time the logical bridge port state database is updated, the nodes consult their external network port mapping table (FIG. 5) to find an entry relevant to the logical bridge port that has been changed. By definition, the corresponding external network port has to be a local bridge port of a certain node. That node then updates its local port state database with a new port state.

Referring to FIG. 7(B), an example of the forwarding database (5) is shown in table form. The nodes use this table to determine on which port each received data frame should be forwarded. More specifically, the forwarding database maps a given MAC address onto a specific port number for frame transmission.

The nodes consult their forwarding database on two occasions. One is when a node learns MAC addresses from received data frames. More specifically, a node extracts the source MAC address from each data frame received first time from different end stations and saves a record of that MAC address in association with the receiving port number (it is either of an external network port or of an inter-node connection port). The other occasion is when a node forwards an incoming data frame to another node. More specifically, a node looks up the forwarding database by using the frame's destination MAC address as the search keyword. The frame is then directed to the outgoing port that is determined from the database.

The following section gives a more detailed description of how the first embodiment operates.

(1) Initial Setup

The network administrator builds an external network port mapping table (see FIG. 5) in each node, before starting up the entire network system. The nodes, once started up, automatically configure their logical bridge port parameters (FIG. 6), local port state database (FIG. 7(A)), and forwarding database (FIG. 7(B)) during normal operations. No specific values are included in those diagrams, for this reason.

FIGS. 8(A), 8(B), 8(C), and 8(D) show examples of initial setup values for an external network port mapping table (FIG. 5) that associates external network ports with logical bridge ports on each node. As can be seen from those figures, external network ports P11, P21, P31, and P41 of the frame forwarding devices 61 to 64 are mapped onto the logical bridge ports LP1 to LP4, respectively.

FIG. 9(A) shows an example of a logical bridge identifier, which is one of the logical bridge parameters (see FIG. 4). As FIG. 9(A) implies, bridge identifiers, including this logical bridge's, are eight octets in length. The lower the number, the higher priority the bridge owns.

FIG. 9(B) shows an example of initial setup of logical bridge port identifiers, which are defined as part of the logical bridge port parameters (FIG. 6). As seen, the logical bridge port identifiers are two octets in length. The lower the number, the higher priority the port owns. In the example of FIG. 9(B), four logical bridge ports LP1 to LP4 are assigned different port identifiers 0x0001 to 0x0004, respectively, and they have successively lower priorities.

Figure 10:
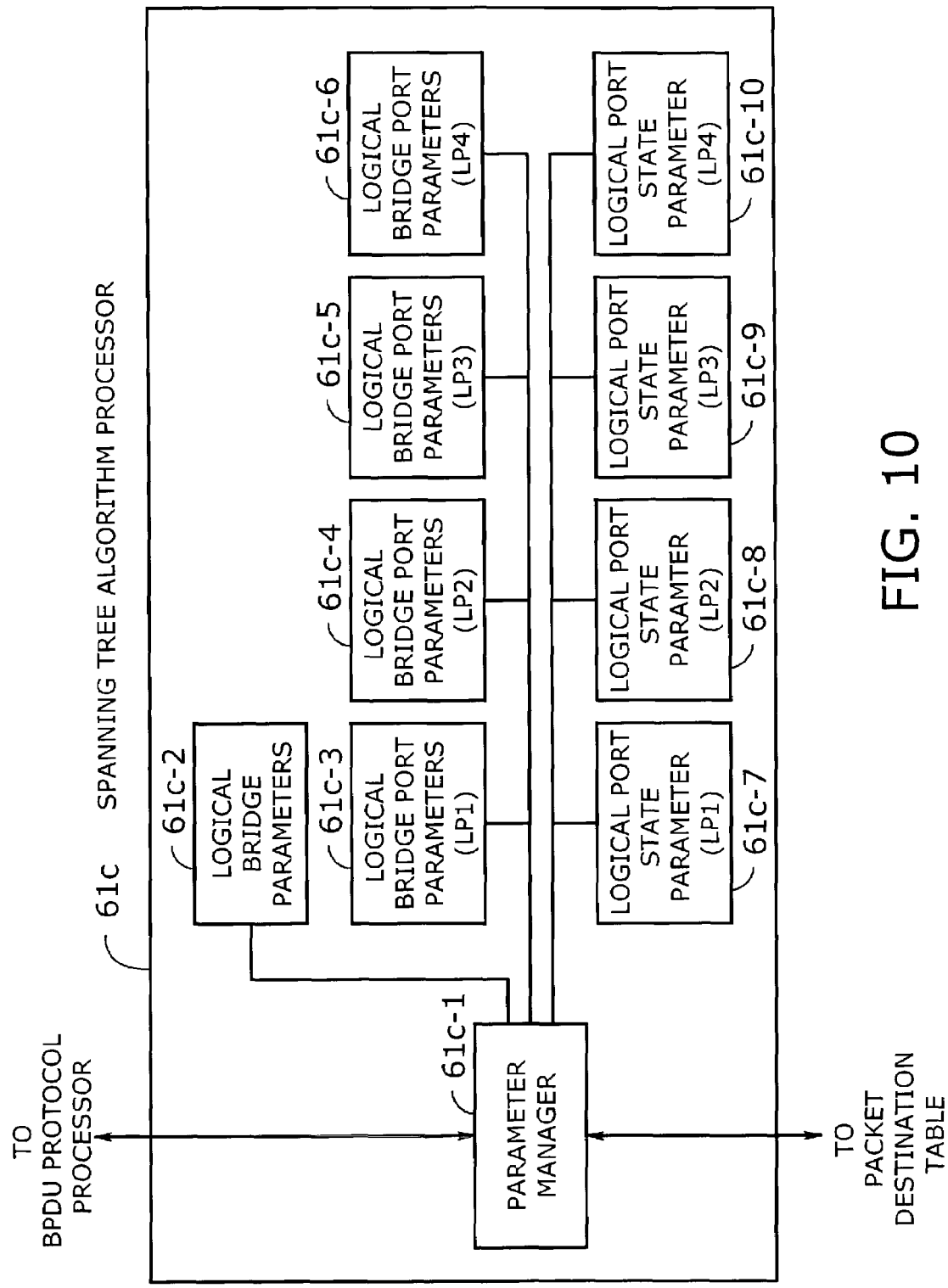
FIG. 10 shows details of a spanning tree algorithm processor and parameter tables stored therein.

FIG. 10 shows the details of the spanning tree algorithm processor 61c and parameter tables stored therein. As can be seen in this diagram, the spanning tree algorithm processor 61c has the following blocks and items: a parameter manager 61c-1, logical bridge parameters 61c-2, four sets of logical bridge port parameters 61c-3 to 61c-6, and four individual logical port state parameters 61c-7 to 61c-10.

Here, the parameter manager 61c-1 maintains various parameters listed above. The logical bridge parameters 61c-2 are what have been explained earlier in FIG. 4. The logical bridge port parameters 61c-3 to 61c-6 are what have been explained earlier in FIG. 6. The logical port state parameters 61c-7 to 61c-10 are the content of "State" field shown in FIG. 6.

(2) Normal Operations

Briefly, the first embodiment operates as follows in normal situations. The nodes having logical bridge ports are ready to receive BPDUs from user networks. Upon receipt of a BPDU, the receiving node parses it and notifies other nodes of the received information with appropriate protocols, besides configuring its own logical bridge parameters and logical port parameters accordingly. The notification is accomplished by broadcasting a kind of control message over pre-established inter-node control paths. Actually, this inter-node control message is composed of the received BPDU itself and the receiving logical port number.

Figure 11:
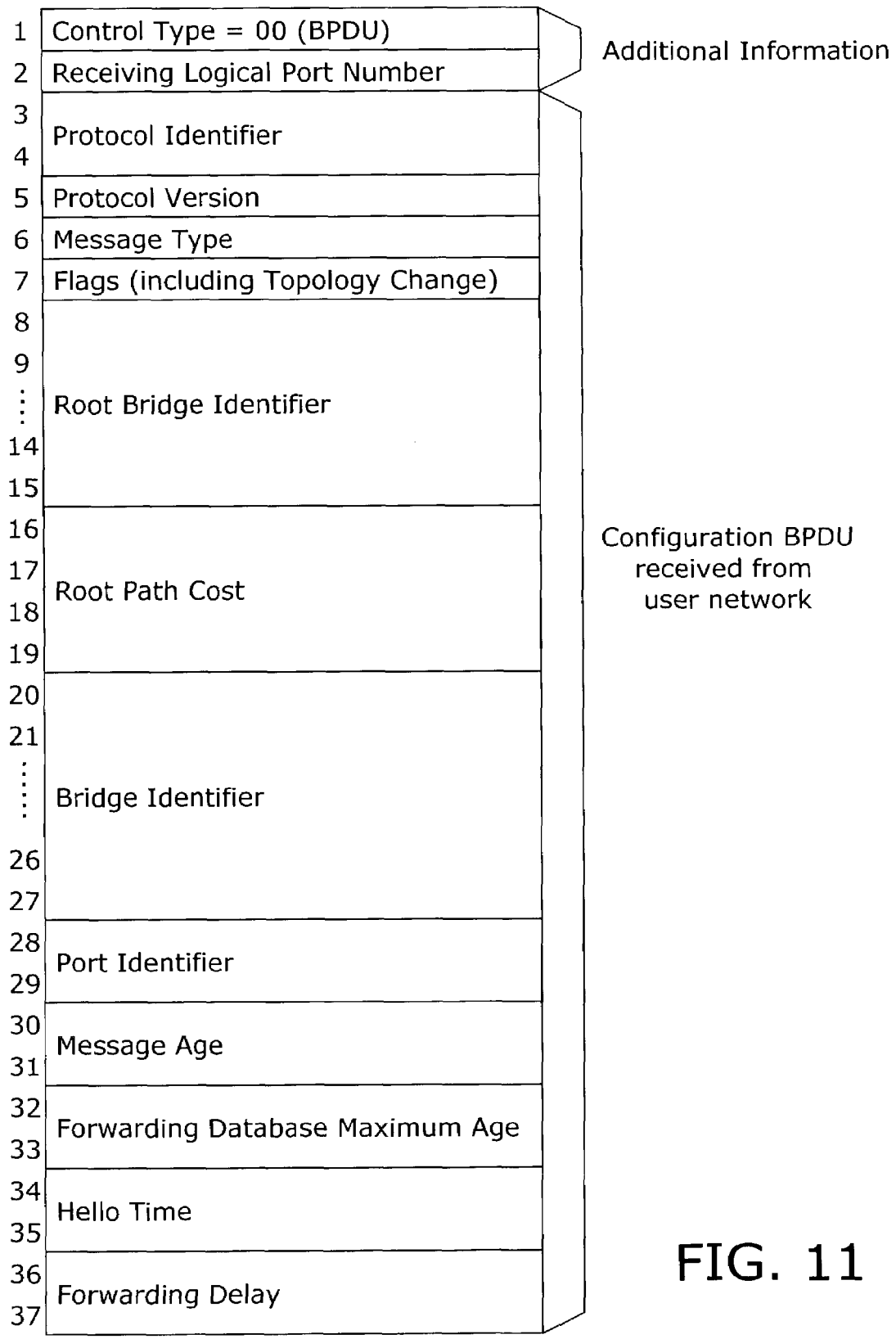
FIG. 11 shows the format of messages exchanged between nodes.

The inter-node control message mentioned above is shown in FIG. 11. The message begins with two fields named "Control Type" and "Receiving Logical Port Number," which are followed by a Configuration BPDU message in the format stipulated in the spanning tree protocol specifications. Note that the BPDU part is exactly what the node has received from a user network.

More specifically, the inter-node control message is structured as follows. The first field "Control Type" contains a value of zero to indicate that the present message contains a Configuration BPDU. The next field "Receiving Logical Port Number" shows the port number of a logical bridge port on which the BPDU was received. "Protocol Identifier" field is two bytes in length and contains a value of zero, indicating that the message complies with the standard spanning tree protocol. "Protocol Version" field is a one-byte field with a value of zero. "Message Type Field" is also one byte long and has a value of zero, meaning that the message is a Configuration BPDU. "Flags" field in the 7th octet carries "Topology Change" flag in its bit #8 and "Topology Change Acknowledge" flag in its bit #1.

"Root Bridge Identifier" field occupies the 8th to 15th octets in the message, containing the identifier of a bridge that the original sender of the BPDU believes to be the root bridge. "Root Path Cost" field in the 16th to 19th octets indicates the total path cost from the original sender of the BPDU to the root bridge (or the bridge believed to be the root). "Bridge Identifier" field uses the 20th to 27th octets to carry the bridge identifier of the original sender of the BPDU. "Port Identifier" field occupies the 28th and 29th octets to indicate which bridge port the original sender has used to transmit the BPDU. "Message Age" field in the 30th and 31st octets shows the time elapsed since the BPDU was sent by the root bridge. "Forwarding Database Maximum Age" field in the 32nd octet shows how long the forwarding database can live. This time limit, applicable to the entire bridge network, is set by the root bridge and distributed on a BPDU to the other bridges. "Hello Time" field in the 34th and 35th octets indicates the time between configuration BPDU messages transmitted by the root bridge. "Forwarding Delay" field in the 36th and 37th octets indicates the length of time that bridges should wait before transitioning to a new state (i.e., from "listening" to "learning", or from "learning" to "forwarding") after a topology change. This delay is defined by the root bridge and distributed to non-root bridges.

Figure 12A:
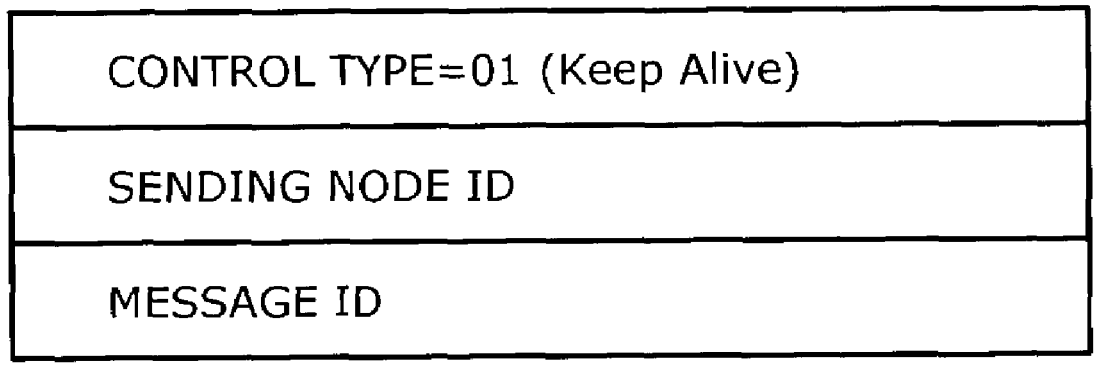
FIG. 12(A) shows a Keep-Alive message.

The protocol processor in a node periodically exchanges Keep-Alive messages with its peer protocol processors in other nodes, the frame structure of which is shown in FIG. 12(A). When sending a Keep-Alive message, the node sets its own node identifier to the "Sending Node ID" field, generates a unique number, and enters it to the "Message ID" field. The protocol processor sends out this message to all inter-node control paths.

Figure 12B:
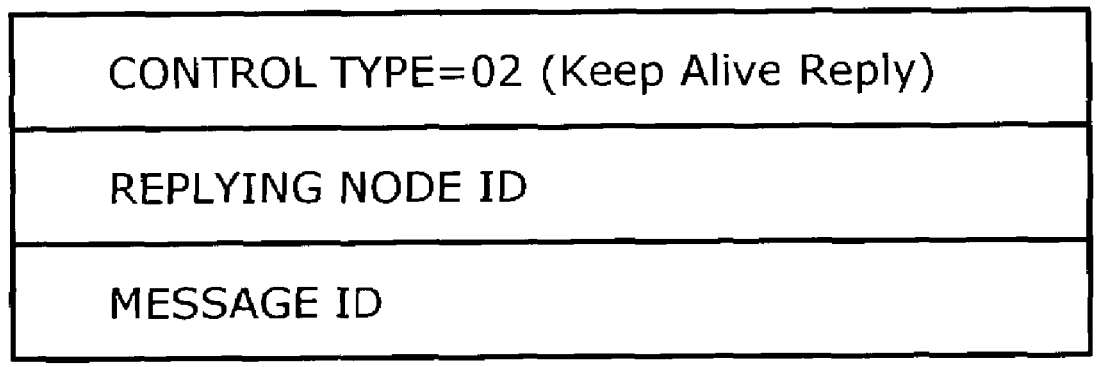
FIG. 12(B) shows a Keep-Alive Reply message.

When a Keep-Alive message is received from some other node, the protocol processor responds to it by returning a Keep-Alive Reply message shown in FIG. 12(B). The Keep-Alive Reply message contains the node identifier of the responding node and the message ID of the received Keep-Alive message. The protocol controller transmits this reply message over the same inter-node control path that has delivered the original Keep-Alive message.

Figure 13:
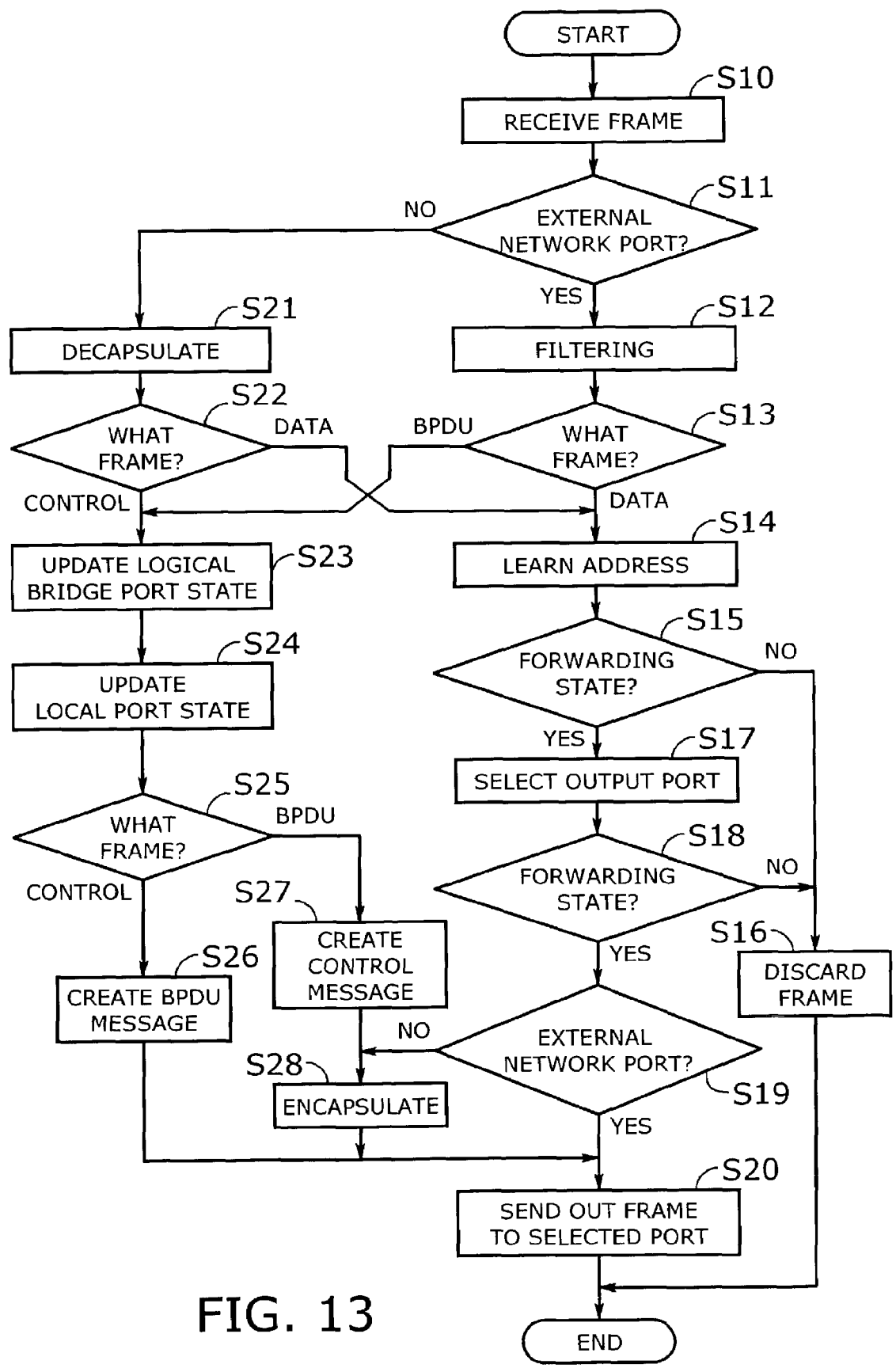
FIG. 13 is a flowchart which explains how the first embodiment operates in normal situations.

FIG. 13 is a flowchart which explains how the first embodiment operates in normal situations. The frame forwarding device 61 executes the following steps.

STEP S10:
  The frame forwarding device 61 receives a frame.

STEP S11:
  The frame forwarding device 61 determines on which port the frame was received at step S10. If it was on an external network port, the process advances to step S12. If not, the process proceeds to step S21.

STEP S12:
  Consulting its local port state database (FIG. 7(A)), the frame forwarding device 61 subjects the received frame to a filtering process. More specifically, the frame forwarding device 61 first consults its local port state database to see the current state of the receiving port, and then it determines whether to pass or discard the frame, depending on that current port state as shown in FIG. 14.

STEP S13:
  The frame forwarding device 61 determines what the received frame is. If it is a BPDU frame, the process branches to step S23. If it is a data frame, the process proceeds to step S14.

STEP S14:
  The frame forwarding device 61 executes an address learning process with the received frame. That is, it extracts the source MAC address from the received data frame and stores that MAC address and its associated receiving port number in the forwarding database shown in FIG. 7(B).

STEP S15:
  The frame forwarding device 61 determines in which state the receiving port is. If the receiving port is in "forwarding" state, the process advances to step S17. Otherwise, the process goes to step S16.

STEP S16:
  The frame forwarding device 61 discards the received data frame and exits from the current process.

STEP S17:
  The frame forwarding device 61 invokes a process to determine which output port to use in forwarding the data frame. More specifically, it searches the forwarding database by using the frame's destination MAC address as the search keyword. The obtained entry indicates a relevant output port.

STEP S18:
  The frame forwarding device 61 determines in which state the output port is. If the port is currently in "forwarding" state, the process advances to step S19. Otherwise, the process goes to step S16.

STEP S19:
  The frame forwarding device 61 determines which port type the output port is. If it is an external network port, the process advances to step S20. If it is an inter-node connection port, the process proceeds to step S28.

STEP S20:
  The frame forwarding device 61 sends the frame out the selected output port and exits from the current process.

STEP S21:
  Since the frame is encapsulated, the frame forwarding device 61 now decapsulates the frame to extract its content.

STEP S22:
  The frame forwarding device 61 sees the content of the decapsulated frame. If it turns out to be a "control frame" (i.e., "inter-node control message" explained in FIG. 11), the process advances to step S23. If it is a data frame, the process branches to step S14.

STEP S23:
  The frame forwarding device 61 is now having an inter-node control message (see step S22) or BPDU (see step S13), either of which contains configuration management information that affects the port states. In the case of an inter-node control message, the frame forwarding device 61 updates the logical bridge parameters according to the "Receiving Logical Port Number" field and BPDU section of the message. In the case it is a BPDU that arrived on an external network port, the frame forwarding device 61 updates the logical bridge parameters according to the BPDU, further with reference to the external network port mapping table.

STEP S24:
  Based on the logical bridge port states updated, and consulting the external network port mapping table, the frame forwarding device 61 updates the state of its local bridge ports associated with the logical bridge ports.

STEP S25:
  The frame forwarding device 61 determines what frame it is dealing with. If it is a BPDU, the process goes to step S27. If it is an inter-node control message, the process goes to step S26.

STEP S26:
  If it is necessary to retransmit a BPDU, the frame forwarding device 61 creates it from the content of the received inter-node control message. The process then advances to step S20 to send out the created message.

STEP S27:
  Now the frame forwarding device 61 knows it is dealing with a BPDU received on an external network port. It then identifies which logical bridge port the receiving external network port corresponds to, and composes an inter-node control message with the identified logical bridge port number in the Receiving Logical Port Number field.

STEP S28:
  The frame forwarding device 61 encapsulates the inter-node control message created at step S27. The process then advances to step S20 to send out the message.

Through the above steps, the frame forwarding devices transfers received data frames to their destinations. If the received frame is a BPDU message, or if it is a control frame (inter-node control message) sent from some other forwarding unit, the receiving frame forwarding device updates its own logical bridge parameters and other related data, as well as forwarding the BPDU or control frame to other frame forwarding devices. This feature of the present invention enables a telecommunications carrier to provide bridging services for geographically dispersed user networks, without losing the privilege to control the topology of their own carrier network. They can thus use their network resources efficiently, taking advantage of the shortest physical links available in their network facilities.

Figure 15:
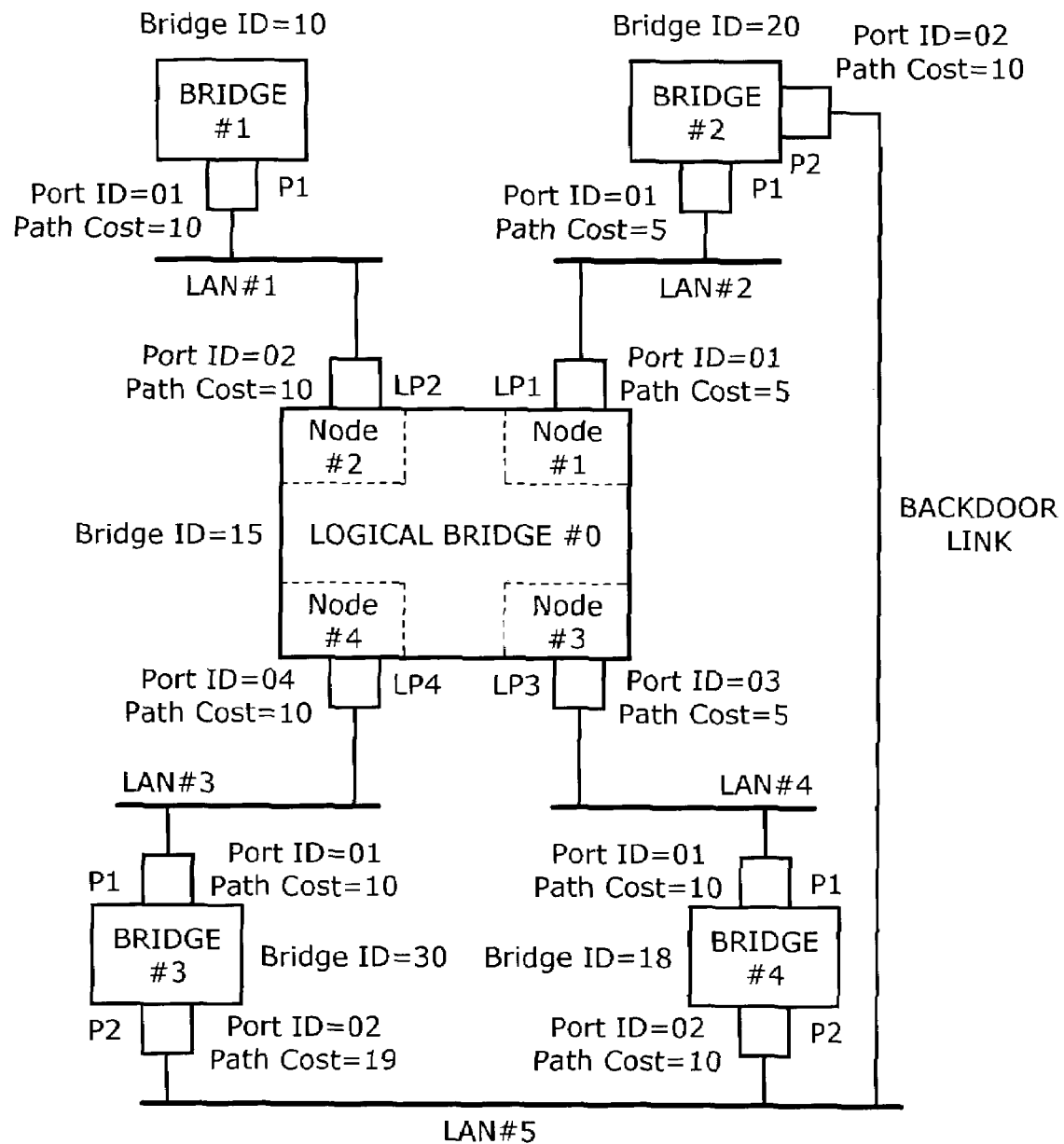
FIGS. 15 and 16 show a specific operation of the first embodiment of the present invention.
Figure 16:
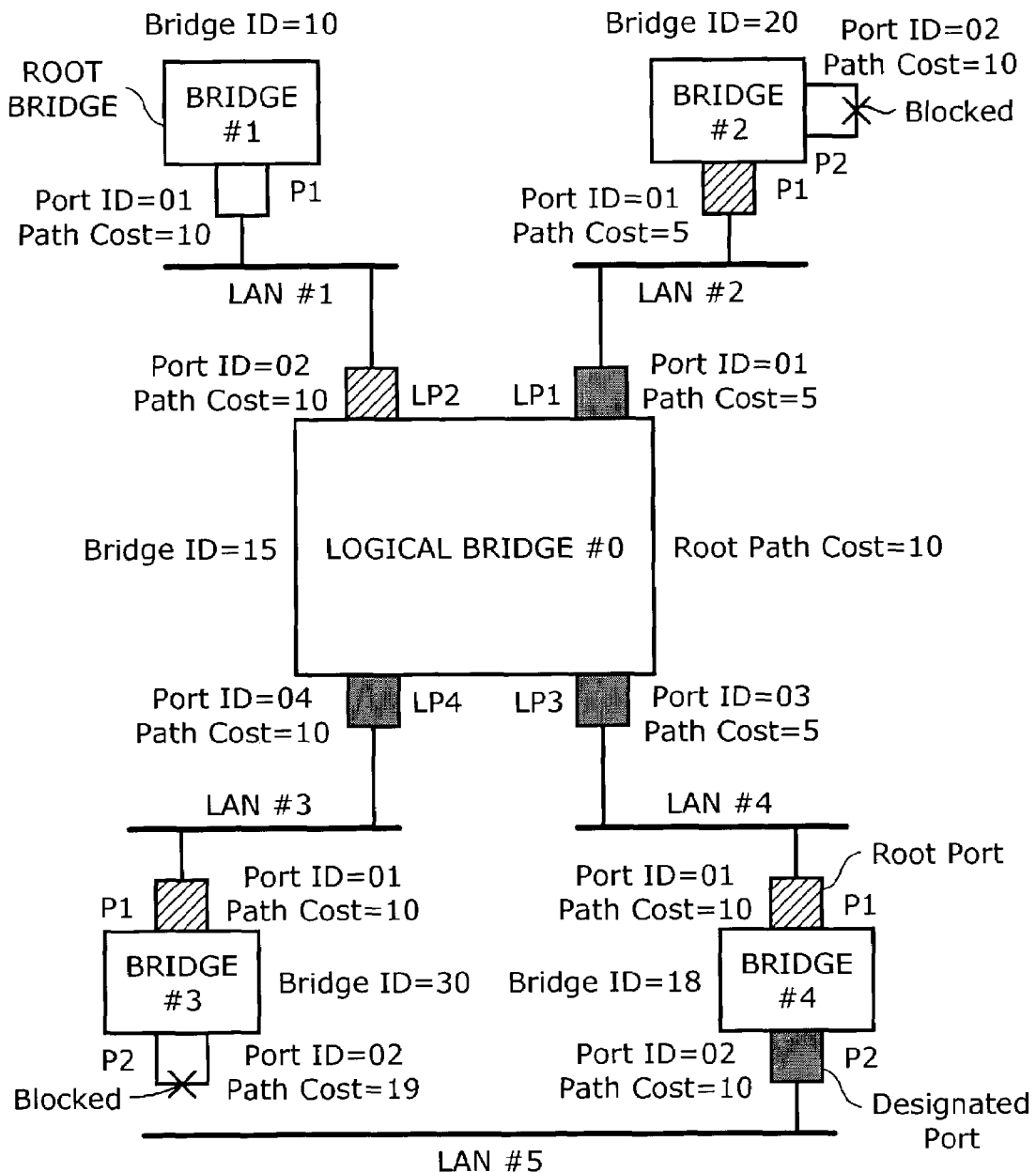

Referring now to FIGS. 15 and 16, a more specific operation of the first embodiment will be described. FIG. 15 shows a logical view of a network system in which the frame forwarding system of FIG. 2 is centrally placed as a logical bridge #0 for interconnecting a plurality of LANs. More specifically, the logical bridge #0 is coupled to LANs #1 to #4, on which bridges #1 to #4 are placed, respectively. Another LAN #5 is coupled to LAN #3 and LAN #4 via the bridges #3 and #4, respectively. Further, there is a backdoor link that extends from LAN #5 to port P2 of the bridge #2. LANs #1 to #5 are user networks, and the logical bridge #0 is actually a carrier's backbone network consisting of a plurality of internal network nodes and inter-node links discussed earlier in FIG. 2.

(1) Election of Root Bridge

The logical bridge #0 has four logical ports LP1 to LP4, which physically belong to edge nodes inside the logical bridge #0. Those edge nodes forward BPDUs received from a bridge on a user network to other nodes within the logical bridge #0. The spanning tree algorithm processor in each receiving node reads the configuration data in the received (or forwarded) BPDU, and updates its own logical bridge parameter "Designated Root" with the bridge identifier of the original sender of the BPDU. It also evaluates the path cost of each BPDU arriving at logical bridge ports and designates the logical bridge port that received the lowest-cost BPDU as a root port, which is supposed to provide the closest path to the root bridge in terms of path costs.

In the present example of FIG. 15, the logical bridge port LP2 on node #2 becomes the root port because LP2 receives a BPDU from the bridge #1 that has the highest priority (i.e., its bridge identifier "10" is the lowest of all). The node #2 records the root bridge identifier "10" as one of its own bridge parameters. The bridge #1's BPDU is also forwarded from the node #2 to other nodes in the logical bridge #0, allowing them to compare it with BPDUs from other sources. Finally, all nodes recognize the bridge #1 as the root and thus stores its bridge identifier "10" in their bridge parameters.

(2) Selection of Designated Bridges

On its root port LP2, the logical bridge #0 listens to configuration BPDUs that are periodically sent from the root bridge #1. The logical bridge #0 is responsible for forwarding those BPDUs out designated ports, after incrementing their path cost field value by a predefined path cost of each port.

Inside the logical bridge #0, the node #2 distributes the configuration data to other internal nodes according to the protocol of the present invention. Upon receipt of the configuration data (originally a BPDU from root bridge), each receiving node increments the "Root Path Cost" field value in the BPDU by a path cost previously defined for each logical bridge port. As FIG. 15 shows, the path cost value is different from port to port. Each node creates and transmits a BPDU with an incremented path cost value through its responsible logical bridge port. Specifically, the node #1 sends it out the first logical bridge port LP1, and the node #3 sends it out the third logical bridge port LP3. Likewise, the node #4 sends it out the logical bridge port LP4.

The remaining logical bridge ports LP1, LP3, and LP4, on the other hand, receive a BPDU from the bridges #2, #4, and #3, respectively. Those BPDUs carry the identifier of each sending bridge, which is: "20" for bridge #2, "30" for bridge #3, and "18" for bridge #4. None of those bridge identifiers is lower than the logical bridge #0's identifier "15," meaning that the logical bridge #0 has a higher priority level than the other bridges. Accordingly, the logical bridge #0 becomes the "designated bridge" that serves all those LANs #2, #3, and #4.

More specifically, the node #1 in the logical bridge #0 receives a BPDU with a bridge identifier of "20" from the bridge #2, the configuration data of which is distributed from the node #1 to the other nodes #2 to #4. The node #1 then compares its own logical bridge identifier "15" with the received bridge identifier "20," thus determining that LP1 be the designated port of LAN #2. The spanning tree algorithm processor records this decision in its logical bridge port parameters. That is, the logical bridge's bridge identifier "15" is set to "Designated Bridge" field, and the port identifier "01" of LP1 is set to "Designated Port" field. With the configuration data supplied from node #1, the nodes #2, #3, and #4 also make the same decision and set their respective logical port parameters. Just as the node #1 handles BPDUs on LP1, the other nodes #2 to #4 will also deal with BPDUs that they receive.

FIG. 16 shows the overall result of the above port designation process. Here, the hatched rectangles (e.g., LP2) represent the root port of each bridge, and the solid filled rectangles (e.g., LP1, LP3, LP4) show the designated port of each LAN segment. The spanning tree algorithm has blocked the port P2 of bridge #3 since LAN #5 could be part of a loop path, and since the port P2 of bridge #3 has a higher root path cost than the port P2 of bridge #4. The bridge #4 thus survives the selection and is now serving as the designated bridge of LAN #5. Similarly to the above, the spanning tree algorithm has removed a backdoor link between the bridges #2 and #4 by forcing the port P2 of bridge #2 into a blocked state, thereby avoiding logical looping of network traffic.

As can be seen from the above explanation, the first embodiment of the present invention enables all frame forwarding devices 61 to 64 and backbone network 60 shown in FIG. 2 to behave as if they were a single bridge device, as shown in FIG. 15. The logical bridge hides its backbone-side ports and links from user networks, thus preventing their BPDUs from blocking those ports.

Figure 17:
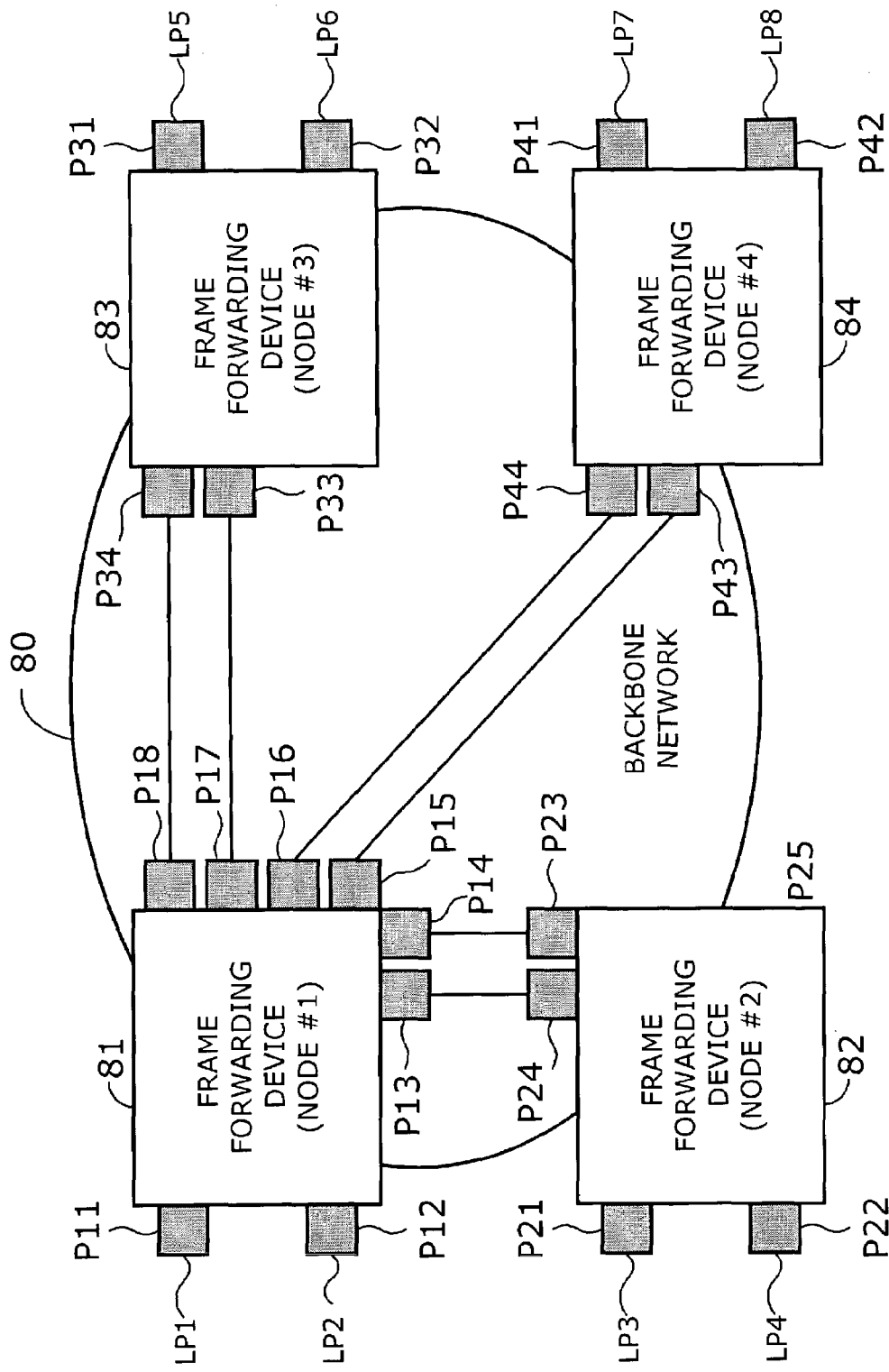
FIG. 17 shows a typical network system according to a second embodiment of the present invention.

Referring next to FIG. 17 and subsequent drawings, a second embodiment of the present invention will be explained below. FIG. 17 shows a network system according to the second embodiment, which involves a plurality of frame forwarding devices 81 to 84 and a backbone network 80 interconnecting them. The first frame forwarding device 81 (node #1) has two external network ports P11 and P12 and six inter-node connection ports P13 to P18. The second frame forwarding device 82 (node #2) has two external network ports P21 and P22 and two inter-node connection ports P23 and P24. The third frame forwarding device 83 (node #3) has two external network ports P31 and P32 and two inter-node connection ports P33 and P34. The fourth frame forwarding device 84 (node #4) has two external network ports P41 and P42 and two inter-node connection ports P43 and P44.

Figure 18:
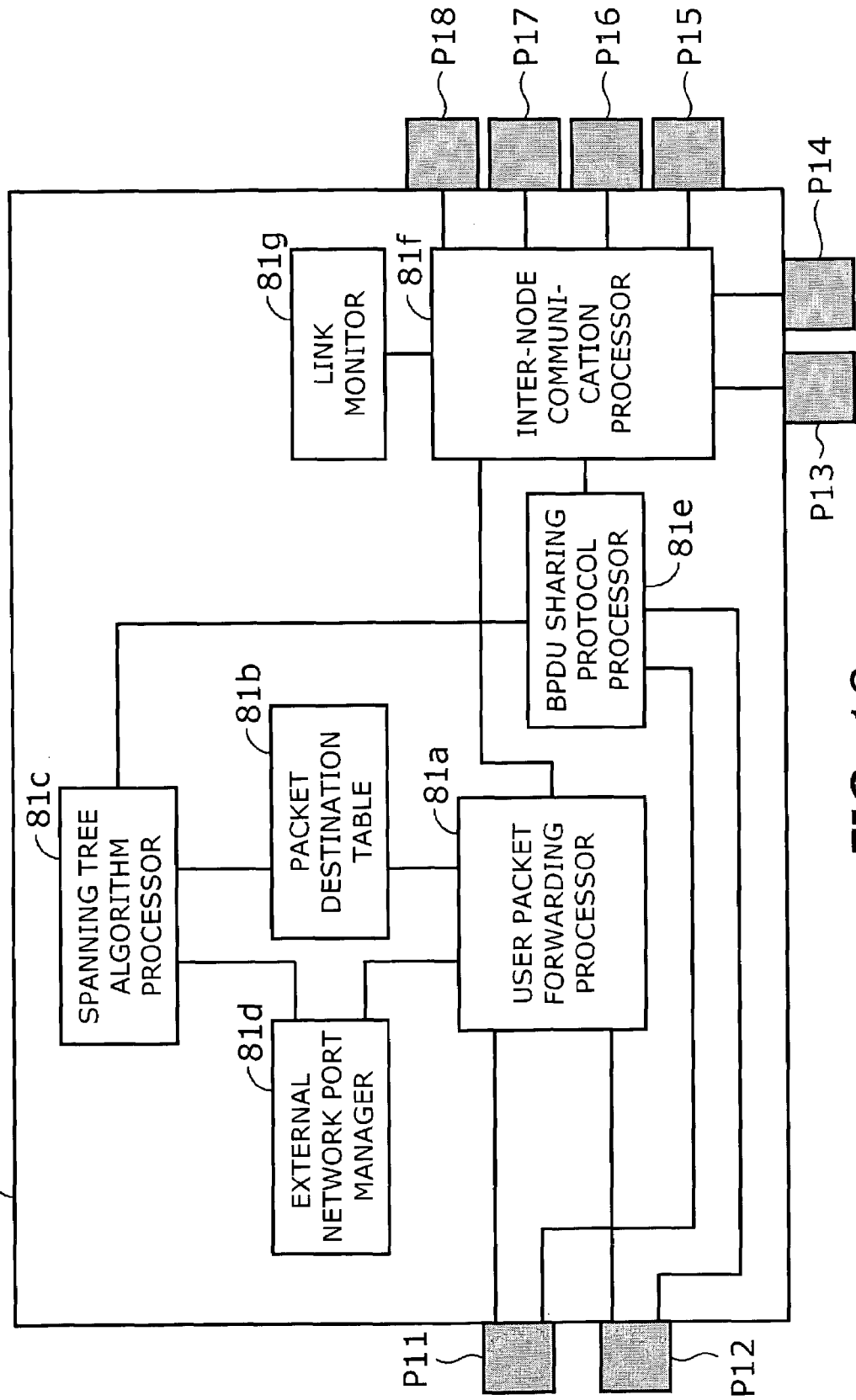
FIG. 18 gives details of a frame forwarding device shown in FIG. 17.

FIG. 18 shows the detailed structure of the first frame forwarding device 81. This unit 81 has the following functional elements: a user packet forwarding processor 81a, a packet destination table 81b, a spanning tree algorithm processor 81c, an external network port manager 81d, a BPDU sharing protocol processor 81e, an inter-node communication processor 81f, a link monitor 81g, and ports P11 to P18.

The user packet forwarding processor 81a receives packets from user networks and forwards them out appropriate ports according to their destinations. The packet destination table 81b is used to determine to which port each received packet should be directed.

The spanning tree algorithm processor 81c configures ports on the node, based on BPDU messages received from the node's own external network ports, as well as based on the network topology configuration data received from other nodes, so that all edge nodes serving a specific group of external networks, together with their associated backbone facilities, will operate as a single logical bridge node. The spanning tree algorithm processor 81c also issues STP BPDUs containing network topology configuration data.

The external network port manager 81d manages the state of every external network port on the node. The BPDU sharing protocol processor 81e, on the other hand, exchanges protocol messages with other nodes to provide them with network topology configuration data contained in BPDU messages. The inter-node communication processor 81f is responsible for practical tasks of node-to-node message transmission and reception. The link monitor 81g watches the condition of each link, in an attempt to detect a connectivity problem.

The illustrated frame forwarding device 81 has eight ports. Two external network ports P11 and P12 to interface with external networks, while five inter-node connection ports P13 to P18 to interface with other nodes on the backbone network 80.

FIG. 19 shows a table that gives the association between inter-node connection ports of the node #1 itself and logical bridge ports on other nodes. This table is referred to as the "incoming inter-node connection port mapping table." FIG. 20, on the other hand, shows a table that gives the association between logical bridge ports and inter-node connection ports on the node #1. The node #1 consults this table to determine which inter-node connection port should be used to forward a BPDU to another node, when it is received on a specific logical bridge port. This table is referred to as the "outgoing inter-node connection port mapping table."

According to the second embodiment of the invention, the frame forwarding device 81 operates as follows. When an STP BPDU is received on an external network port P11 or P12, the BPDU sharing protocol processor 81e extracts network topology configuration data from the received STP BPDU and forwards that data to other nodes, as well as sending it the spanning tree algorithm processor 81c. This is accomplished by identifying particular inter-node connection ports associated with the receiving external network port, and then forwarding the received STP BPDU on those ports, with the assistance of the inter-node communication processor 81f.

The outgoing inter-node connection port mapping table of FIG. 20 aids the BPDU sharing protocol processor 81e to do the above task. More specifically, BPDUs received on an external network port P11 (i.e., logical bridge port LP1) are forwarded out inter-node connection ports P13, P15, and P17. Similarly, BPDUs received on another external network port P12 (i.e., LP2) are forwarded out inter-node connection ports P14, P16, and P18.

The BPDU sharing protocol processor 81e passes STP BPDUs to the spanning tree algorithm processor 81c when they are received from its peer BPDU sharing protocol processors on other nodes. The spanning tree algorithm processor 81c controls the external network port manager 81d, based on BPDUs received from external network ports P11 and P12, BPDUs supplied from the BPDU sharing protocol processor 81e, and the information about external network ports on other nodes that are associated with BPDU-receiving inter-node connection ports. By so doing, all the nodes and their backbone network 80 that serve a particular group of external networks will behave as a single virtual bridge node in an organized way. The spanning tree algorithm processor 81c also creates and sends an STP BPDU containing network topology configuration data out the external network ports.

Figure 21:
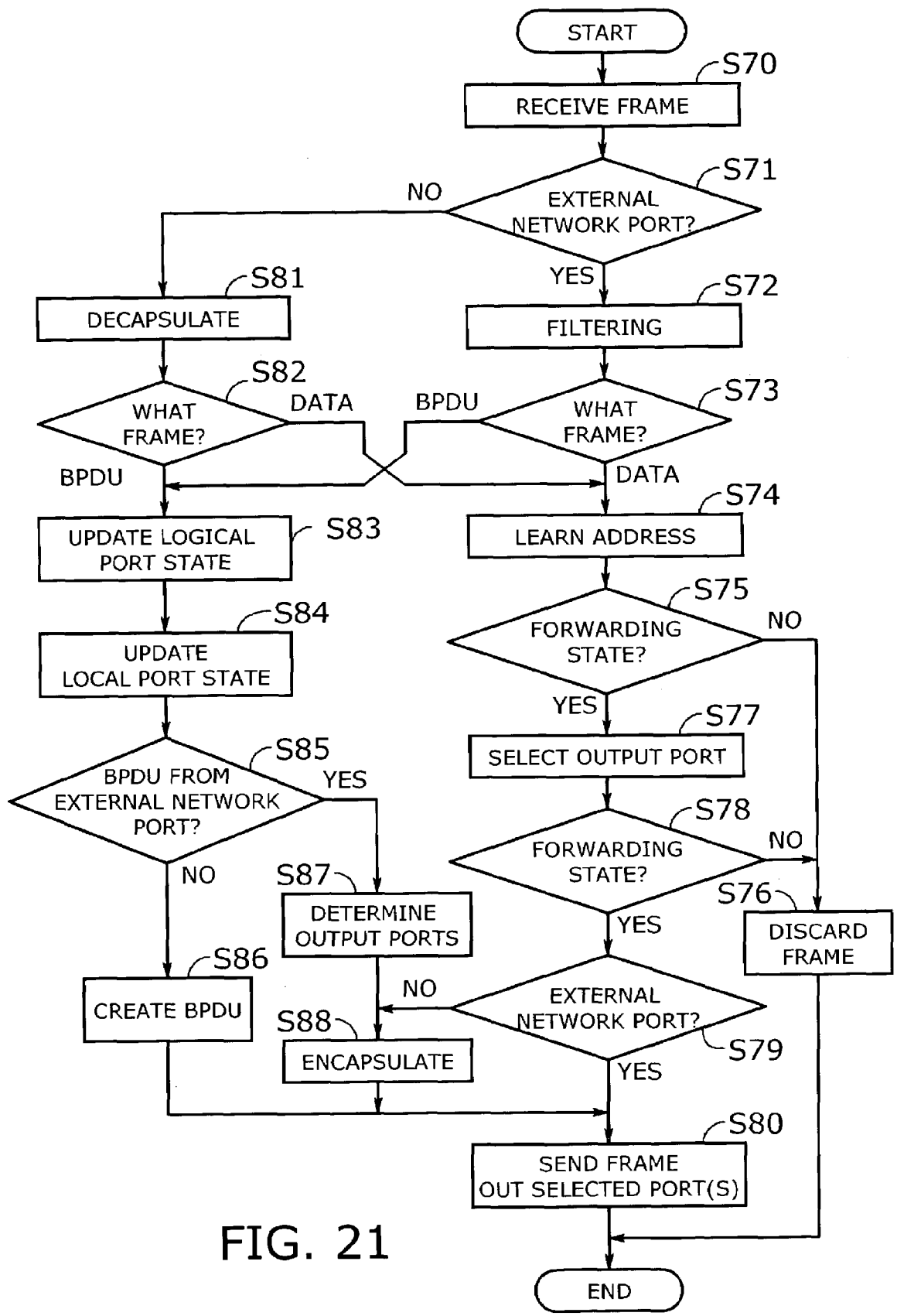
FIG. 21 is a flowchart which explains how the second embodiment operates.

Referring now to the flowchart of FIG. 21, the operation of the second embodiment will be explained in greater detail. The frame forwarding device 81 (node #1) executes the following steps.

STEP S70:
The frame forwarding device 81 receives a frame on its port.

STEP S71:
The frame forwarding device 81 determines on which port the frame was received at step S70. If it was on an external network port, the process advances to step S72. If it was on an inter-node connection port, the process proceeds to step S81.

STEP S72:
Consulting its local port state database (FIG. 7(A)), the frame forwarding device 81 subjects the frame to a filtering process. More specifically, the frame forwarding device 81 first consults its local port state database to see the current state of the receiving port, and then it determines whether to pass or discard the frame, depending on that current port state as shown in FIG. 14.

STEP S73:
The frame forwarding device 81 determines what the received frame is. If it is a BPDU frame, the process proceeds to step S83. If it is a data frame, the process advances to step S74.

STEP S74:
The frame forwarding device 81 executes an address learning process with the received frame. That is, it extracts the source MAC address from the received data frame and stores that MAC address and its associated receiving port number in the forwarding database shown in FIG. 7(B).

STEP S75:
The frame forwarding device 81 determines in which state the receiving port is. If the receiving port is in "forwarding" state, the process advances to step S77. Otherwise, the process goes to step S76.

STEP S76:
The frame forwarding device 81 discards the received data frame and exits from the current process.

STEP S77:
The frame forwarding device 81 invokes a process to determine which output port to use in forwarding the frame. More specifically, it searches the forwarding database by using the frame's destination MAC address as the search keyword. The obtained entry indicates a relevant output port.

STEP S78:
The frame forwarding device 81 determines in which state the output port is. If the port is currently in "forwarding" state, the process advances to step S79. Otherwise, the process goes to step S76.

STEP S79:
The frame forwarding device 81 determines which port type the output port is. If it is an external network port, the process advances to step S80. If it is an inter-node connection port, the process proceeds to step S88.

STEP S80:
The frame forwarding device 81 sends the frame out the selected output port(s) and exits from the current process.

STEP S81:
Since the frame is encapsulated, the frame forwarding device 81 now decapsulates the frame to extract its content.

STEP S82:
The frame forwarding device 81 sees the content of the decapsulated frame. If it is a BPDU frame, the process advances to step S83. If it is a data frame, the process goes to step S74.

STEP S83:
The frame forwarding device 81 is now having a BPDU frame at hand. Its receiving logical bridge port, however, is still unknown when this step S83 has been reached from step S82. If this is the case, the frame forwarding device 81 consults the incoming inter-node connection port mapping table of FIG. 19 to obtain a logical bridge port number corresponding to the receiving inter-node connection port. The frame forwarding device 81 then updates the logical bridge port states with the spanning tree algorithm.

STEP S84:
Based on the logical bridge port states updated, and consulting the external network port mapping table, the frame forwarding device 81 updates the state of its local bridge ports associated with the logical bridge ports.

STEP S85:
The frame forwarding device 81 determines whether the BPDU frame was received on an inter-node connection port or on an external network port. If it was received on an external network port, the process proceeds to step S87. Otherwise, the process advances to step S86.

STEP S86:
The frame forwarding device 81 creates a BPDU if it is necessary to retransmit it. The process then advances to step S80 to send out the created message.

STEP S87:
The frame forwarding device 81 determines on which inter-node connection ports the BPDU should be forwarded. This is accomplished by finding a logical bridge port number that is associated with the external network port on which the BPDU was received, and then retrieving relevant inter-node connection ports from the outgoing inter-node connection port mapping table of FIG. 20. The process then proceeds to step S88.

STEP S88:
The frame forwarding device 81 encapsulates the outgoing BPDU. The process then advances to step S80 to send it out.

As can be seen from the above explanation, the second embodiment of the present invention enables all frame forwarding devices 81 to 84 and backbone network 80 shown in FIG. 17 to act as a single logical bridge device in an organized way. As in the first embodiment, the logical bridge hides its backbone-side ports and links from user networks, thus preventing their BPDUs from blocking those ports. The second embodiment, however, differs from the first embodiment in that BPDUs can be forwarded from one node to other nodes simply by placing them on predetermined ports, without the need for reformatting them into inter-node control messages. The second embodiment realizes it by providing inter-node links each corresponding to individual logical bridge ports on other nodes as shown in FIG. 17, and preparing the tables shown in FIGS. 19 and 20 for a node to find the association between inter-node connection ports and logical bridge ports. This feature of the second embodiment reduces the processing workload in sharing data of BPDUs, thus resulting in a higher throughput.

Figure 22:
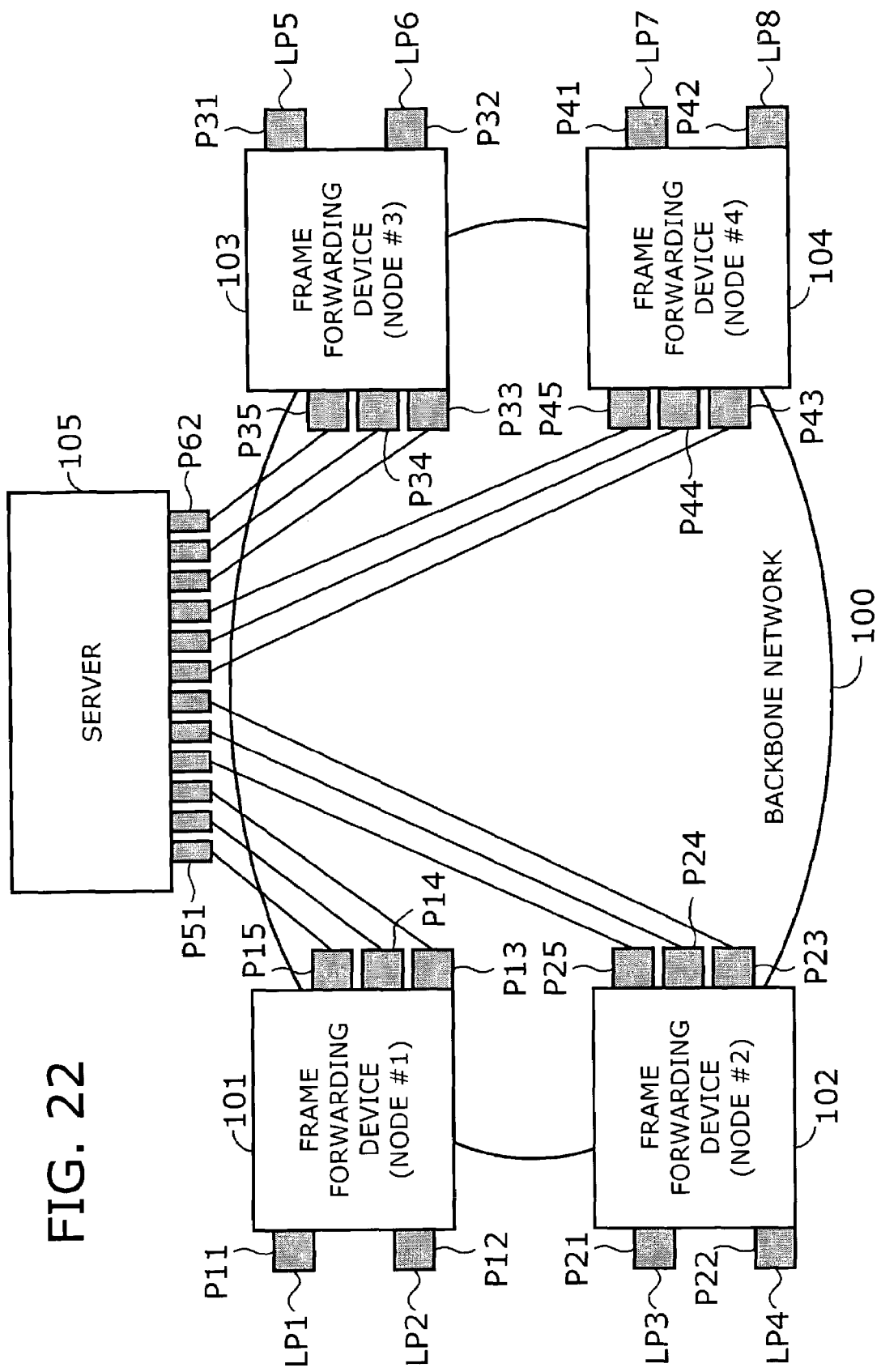
FIG. 22 shows a network system according to a third embodiment of the present invention.

Referring next to FIG. 22 and subsequent drawings, a third embodiment of the present invention will now be explained below. FIG. 22 shows a network system according to the third embodiment, which involves a plurality of frame forwarding devices 101 to 104, a server 105, and a backbone network 100 interconnecting them.

The first frame forwarding device 101 (node #1) has two external network ports P11 and P12 and three inter-node connection ports P13 to P15. The second frame forwarding device 102 (node #2) has two external network ports P21 and P22 and three inter-node connection ports P23 to P25. The third frame forwarding device 103 (node #3) has two external network ports P31 and P32 and three inter-node connection ports P33 to P35. The fourth frame forwarding device 104 (node #4) has two external network ports P41 and P42 and three inter-node connection ports P43 to P45. The server 105 has twelve inter-node connection ports P51 to P62 and manages the state of each external network port, based on BPDUs supplied from the frame forwarding devices 101 to 104.

Figure 23:
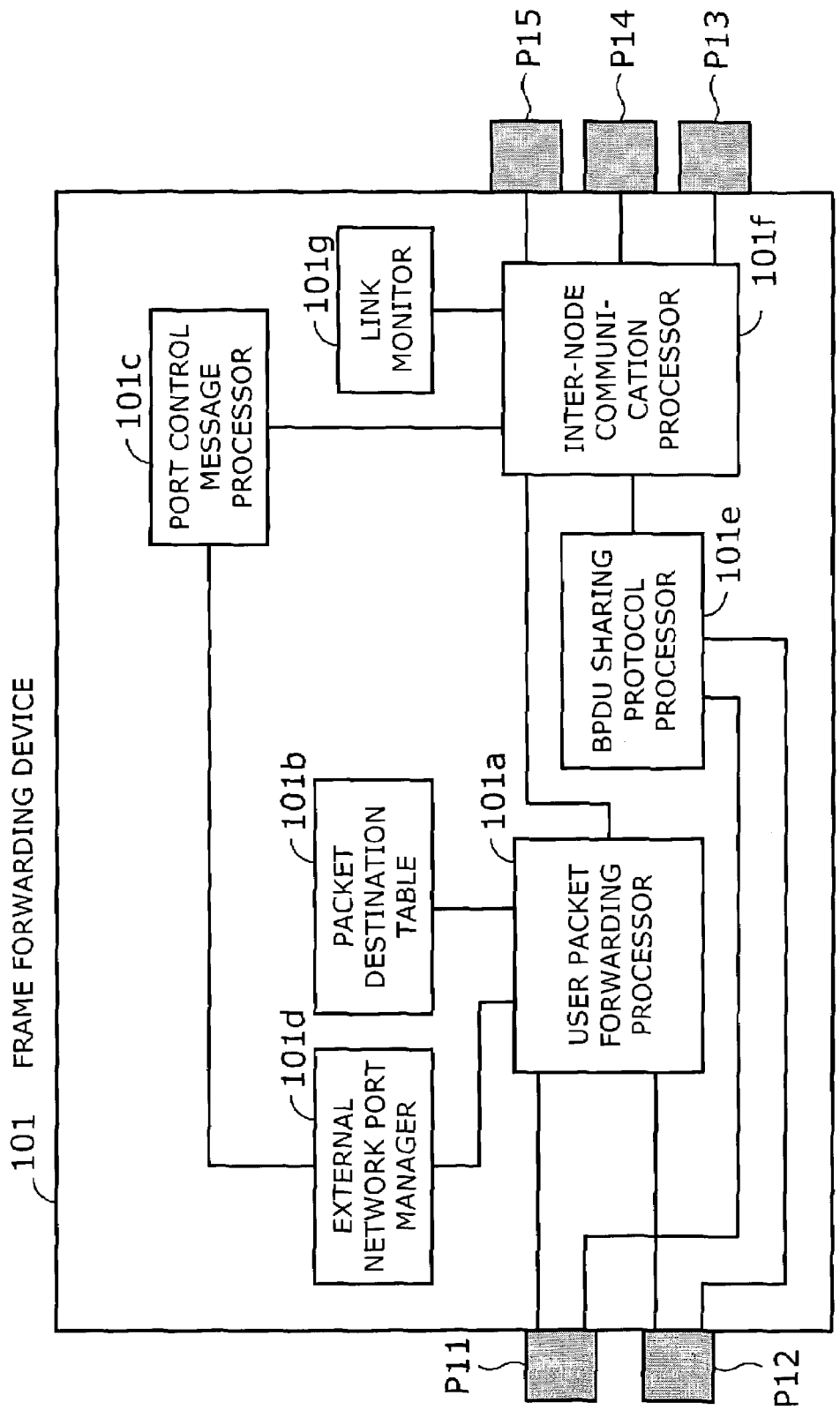
FIG. 23 gives details of a frame forwarding device shown in FIG. 22.

FIG. 23 shows the detailed structure of the first frame forwarding device 101. This unit 101 has the following elements: a user packet forwarding processor 110a, a packet destination table 101b, a port control message processor 10c, an external network port manager 101d, a BPDU sharing protocol processor 101e, an inter-node communication processor 101f, a link monitor 101g, and five ports P11 to P15.

The user packet forwarding processor 101a receives packets from user networks and forwards them out relevant ports according to their destinations. The packet destination table 101b is used to determine to which port each received packet should be directed. The port control message processor 101c parses a port control message sent from the server 105 and notifies the external network port manager 101d of the content. The external network port manager 110d manages the state of every external network port on the node.

The BPDU sharing protocol processor 101e exchanges protocol messages with the server 105 in order to share the network topology configuration data in received BPDUs with other nodes. The inter-node communication processor 101f is responsible for practical tasks of node-to-node message transmission and reception. The link monitor 101g watches the condition of each link, in an attempt to detect a connectivity problem. The frame forwarding device 101 has five ports including: two external network ports P11 and P12 to interface with external networks, and three inter-node connection ports P13 to P15 to reach other nodes.

Figure 24:
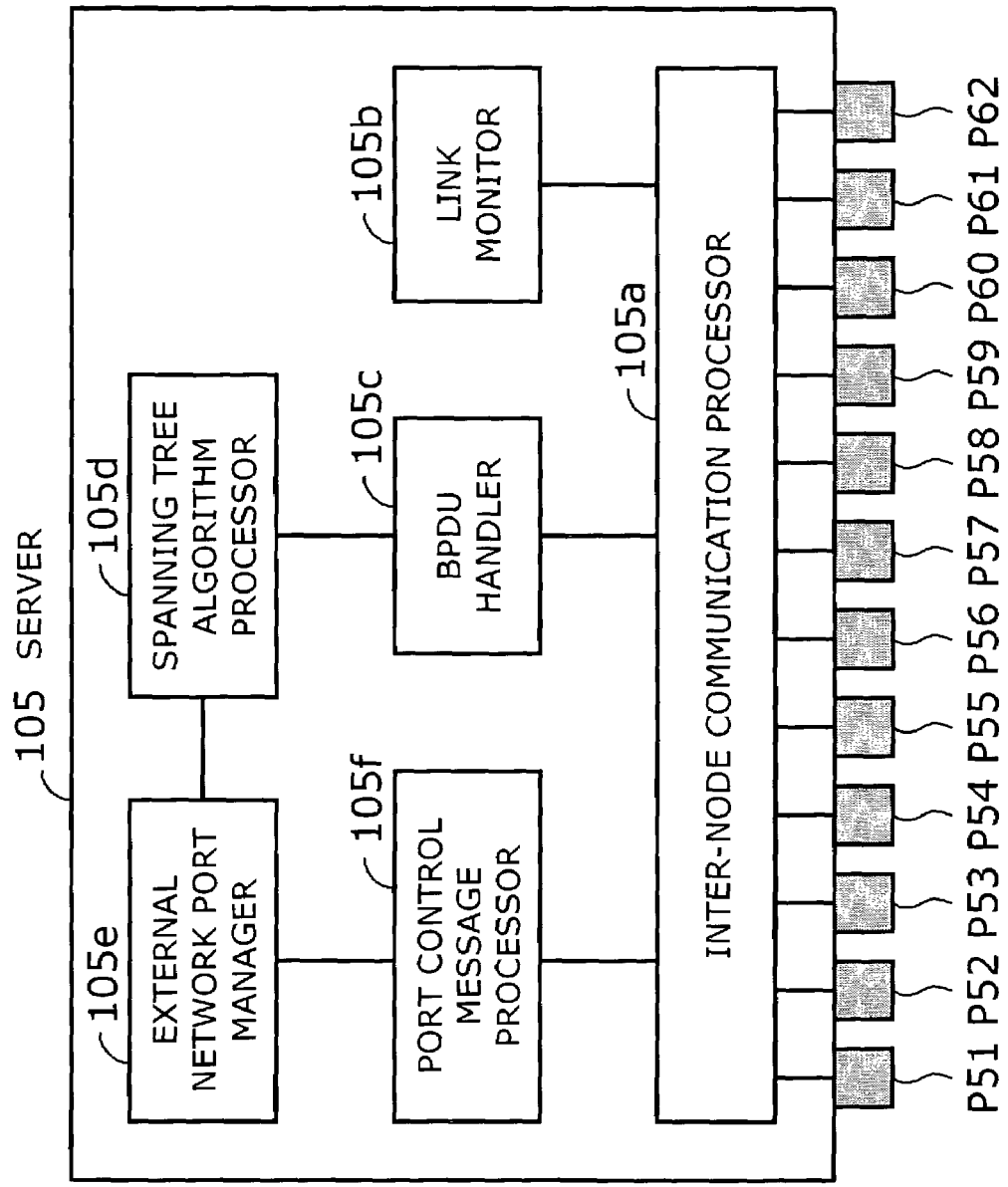
FIG. 24 gives details of a server shown in FIG. 22.

FIG. 24 gives the details of the server 105 shown in FIG. 22. As seen, the server 105 comprises the following elements: an inter-node communication processor 105a, a link monitor 105b, a BPDU handler 105c, a spanning tree algorithm processor 105d, an external network port manager 105e, a port control message processor 105f, and twelve ports P51 to P62.

The inter-node communication processor 105a transfers frames from one frame forwarding device to another, after processing them with a predetermined algorithm. The link monitor 105b watches the condition of each link, in an attempt to detect a connectivity problem.

The BPDU handler 105c supplies the spanning tree algorithm processor 105d with frames arriving at the inter-node communication processor 105a, as well as passing BPDU frames from the spanning tree algorithm processor 105d to the inter-node communication processor 105a. The external network port manager 105e manages the state of each external network port on the nodes #1 to #4. The port control message processor 105f produces a port control message according to the port state information in the external network port manager 105e and sends it out relevant inter-node connection ports, so that the message be delivered to an intended node having an external network port that is to be configured.

The server 105 has several tables to control the state of external network ports. For example, FIG. 25 shows a table representing the association between inter-node connection ports on the server 105 and logical bridge ports on the nodes #1 to #4. FIG. 26 shows another table representing logical bridge ports and their associated inter-node connection ports. This table is used by the server 105 to determine which port to use when it sends a port control message to an intended node in an attempt to change the state of a particular logical bridge port on that node.

The following gives a more detailed description of how the third embodiment makes the system of FIG. 22 work as a single logical bridge. In the proposed system, the server 105 is supposed to manage the logical bridge configuration, and to this end, it employs a spanning tree algorithm processor 105*d*. Upon receipt of a BPDU from an external network, the receiving node forwards it out an inter-node connection port to the server 105. Since the receiving inter-node connection port is known, the server 105 can identify the logical bridge port on which the BPDU was received, consulting the table shown in FIG. 25. This permits the external network port manager 105*e* to update its database, which includes a change in the state of a specific logical bridge port on a node. The server 105 now sends a port control message to that node, requesting it to change its bridge port state. The backbone network 100 functions as an internal bus in the logical bridge, which provides paths for transporting user-to-user data frames, node-to-node BPDUs, and server-to-node port control messages.

Each node #1 to #4 in the logical bridge handles incoming STP BPDUs as follows. When an STP BPDU arrives from a user network, the receiving node sends it to the spanning tree algorithm processor 105*d* in the server 105. The spanning tree algorithm processor 105*d* has a parameter manager (not shown), which updates logical bridge port parameters corresponding to the port on which the STP BPDU was received, as well as logical bridge parameters. To reconfigure the logical bridge ports according to the new parameter values, the parameter manager further asks the port control message processor 105*f* to create and send a port control message to each node whose port(s) will be affected by the change. The port control message processor 105*f* transmits such a port control message to each relevant node through a port control path that has been established between the server 105 and that node. The port control message processor 101*c* in each receiving node parses the message and changes the state of its own bridge port(s) accordingly. The port control message processor 101*c* also updates the packet destination table 101*b*, enabling or disabling entries that are related to the state change.

Referring again to the server 105, the spanning tree algorithm processor 105*d* may need to forward an incoming BPDU to other user networks when it is received through a BPDU transport path. If this is the case, the aforementioned parameter manager in the server 105 places it on other BPDU transport paths, so that the BPDU will be sent out through the logical bridge ports other than the receiving port.

Figure 27:
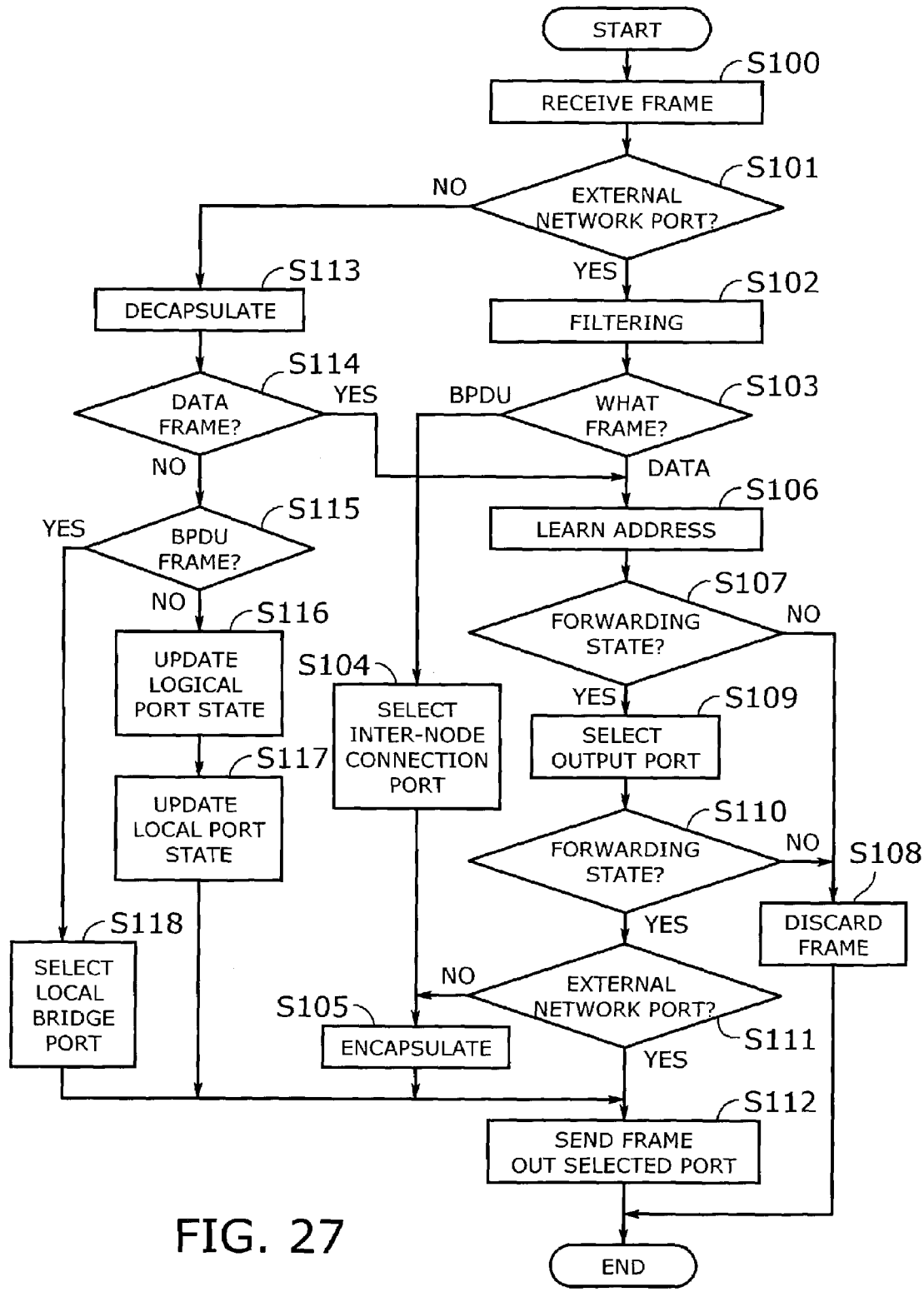
FIG. 27 is a flowchart which explains how the third embodiment operates.

Referring to the flowcharts of FIGS. 27 and 28, the operation of the third embodiment will be described in greater detail below. FIG. 27 shows a process executed by the frame forwarding device 101 (node #1), which includes the following steps.

STEP S100:
The frame forwarding device 101 receives a frame on its port.

STEP S101:
The frame forwarding device 101 determines on which port the frame was received at step S100. If it was on an external network port, the process advances to step S102. If it was on an inter-node connection port, the process proceeds to step S113.

STEP S102:
Consulting its local port state database (FIG. 7(A)), the frame forwarding device 101 subjects the received frame to a filtering process. More specifically, the frame forwarding device 101 first consults its local port state database to see the current state of the receiving port, and then it determines whether to pass or discard the frame, depending on that current port state as shown in FIG. 14.

STEP S103:
The frame forwarding device 101 determines what the received frame is. If it is a BPDU frame, the process proceeds to step S104. Otherwise, the process advances to step S106.

STEP S104:
The frame forwarding device 101 determines on which inter-node connection ports the BPDU should be forwarded to the server 105. This is accomplished by finding an inter-node connection port number(s) that is associated with the BPDU receiving external network port.

STEP S105:
The frame forwarding device 101 encapsulates the outgoing frame. The process then advances to step S112 for forwarding.

STEP S106:
The frame forwarding device 101 executes an address learning process with the received frame. That is, it extracts the source MAC address from the received data frame and stores that MAC address and its associated receiving port number in the forwarding database shown in FIG. 7(B).

STEP S107:
The frame forwarding device 101 determines in which state the receiving port is. If it is in "forwarding" state, the process advances to step S109. Otherwise, the process goes to step S108.

STEP S108:
The frame forwarding device 101 discards the received data frame and exits from the current process.

STEP S109:
The frame forwarding device 101 invokes a process to determine which output port to use in forwarding the data frame. More specifically, it searches the forwarding database by using the frame's destination MAC address as the search keyword. The obtained entry indicates a relevant output port.

STEP S110:
The frame forwarding device 101 determines in which state the selected output port is. If the port is in "forwarding" state, the process advances to step S111. Otherwise, the process goes to step S108.

STEP S111:
The frame forwarding device 101 determines which port type the output port is. If it is an external network port, the process advances to step S112. If it is an inter-node connection port, the process proceeds to step S105 for encapsulation.

STEP S112:
The frame forwarding device 101 sends the frame out the selected port.

STEP S113:
   Since the frame is encapsulated, the frame forwarding device 101 now decapsulates the frame to extract its content.

STEP S114:
   The frame forwarding device 101 determines whether the decapsulated frame is a data frame. If so, the process advances to step S106. If not, the process goes to step S115.

STEP S115:
   The frame forwarding device 101 determines whether the decapsulated frame is a BPDU frame. If so, the process advances to step S118. If not, the process goes to step S116.

STEP S116:
   The frame forwarding device 101 is now having a port control message. Then it updates the state of logical bridge ports according to the received port control message.

STEP S117:
   Based on the logical bridge port states, and consulting the external network port mapping table, the frame forwarding device 101 updates the state of its local bridge ports.

STEP S118:
   The frame forwarding device 101 is now having a BPDU frame to transmit. It then determines on which local bridge port the BPDU frame should be transmitted, based on the inter-node connection port used to receive that BPDU frame. The process then advances to step S112 to send out the BPDU frame out the determined port.

Figure 28:
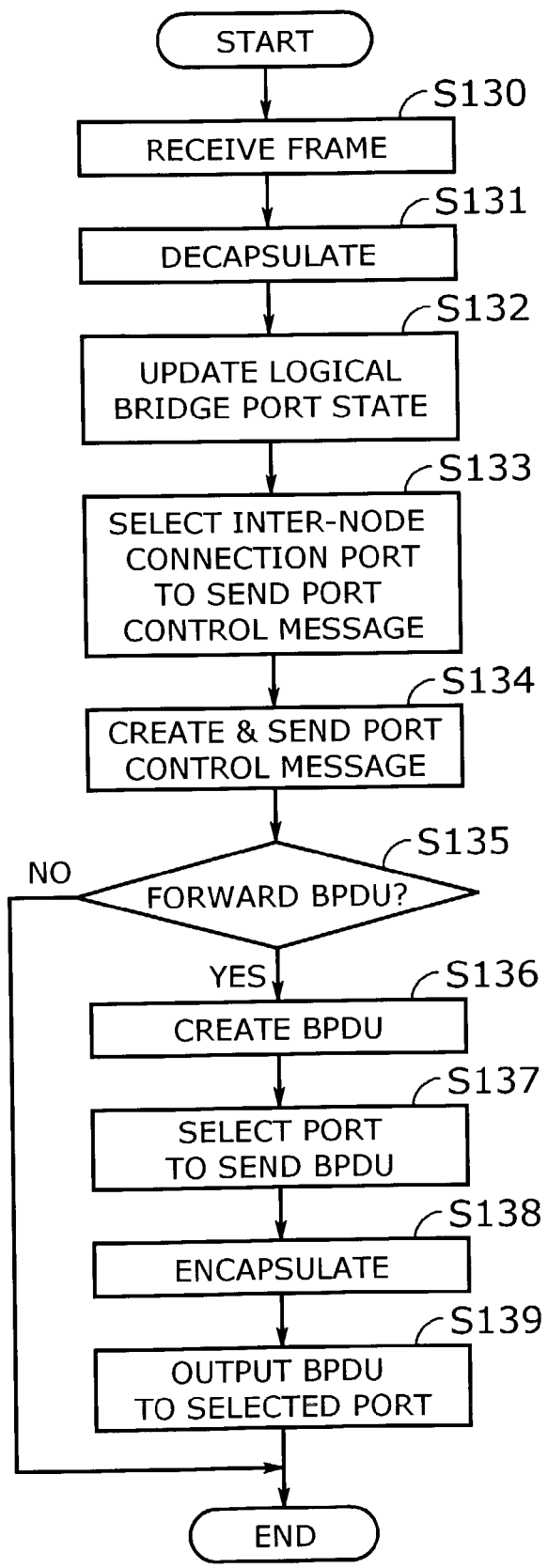
FIG. 28 is a flowchart which explains how the proposed server operates according to the third embodiment.

Referring next to the flowchart of FIG. 28, the following will described a process executed in the server 105. This process includes the following steps:

STEP S130:
   The server 105 receives a frame on one of its inter-node connection ports.

STEP S131:
   Since the frame is encapsulated, the server 105 now decapsulates the frame to extract its content, which is a BPDU received on a logical bridge port.

STEP S132:
   Consulting the inter-node connection port mapping table shown in FIG. 25, the server 105 finds a logical bridge port number corresponding to the receiving inter-node connection port. It then updates the logical bridge port states with the spanning tree algorithm.

STEP S133:
   When there is a state change in the logical bridge ports, the server 105 has to send a port control message to implement that change. Then it selects an inter-node connection port for such a message, consulting the control message port mapping table shown in FIG. 26.

STEP S134:
   The server 105 creates and sends a port control message.

STEP S135:
   The server 105 determines whether the logical bridge has to forward the received BPDU to other user networks. If it has to, the process advances to step S136. Otherwise, the server 105 terminates the present process.

STEP S136:
   The server 105 creates a BPDU frame for transmission.

STEP S137:
   The server 105 determines on which ports the BPDU should be sent. More specifically, the server 105 directs the BPDU to all logical bridge ports except the port that received the original BPDU.

STEP S138:
   The server 105 encapsulates the BPDU in order to transport it over the inter-node links.

STEP S139:
   The server 105 sends the encapsulated frame out the selected ports, so that they will reach the intended logical bridge ports.

The third embodiment of the invention enables the system of FIG. 22 to function as a single logical bridge, as in the first and second embodiments described earlier. Since the logical bridge hides the internal structure of the backbone network 100 in handling BPDUs sent from user networks, the individual backbone links are prevented from being blocked as a result of such BPDUs. Compared to the first two embodiments, the third embodiment is expected to offer a higher performance in spanning tree algorithm processing because it employs a dedicated server 105 to execute tasks related to the algorithm, as opposed to the approach where those tasks are implemented as a function of frame forwarding devices.

Optionally in the first and second embodiments described earlier, the nodes may exchange Keep-Alive messages at regular intervals to ensure that they can correctly reach other nodes serving the same group of external networks. More specifically, the link monitor 61g in each node periodically sends a Keep-Alive message on its inter-node connection ports that lead to it peer nodes in the same group. When a Keep-Alive message arrives at a node, the receiving node responds to that message by sending back a reply message out the same inter-node connection port. Here the practical tasks of transmitting and receiving such Keep-Alive messages and their reply messages are carried out by an inter-node communication processor 61f of each node. The sending node waits for a reply message from the destination node, and if there was no reply in a predetermined period, it would generate an alarm to indicate that the inter-node connection path to the destination node is lost.

Figure 29A:
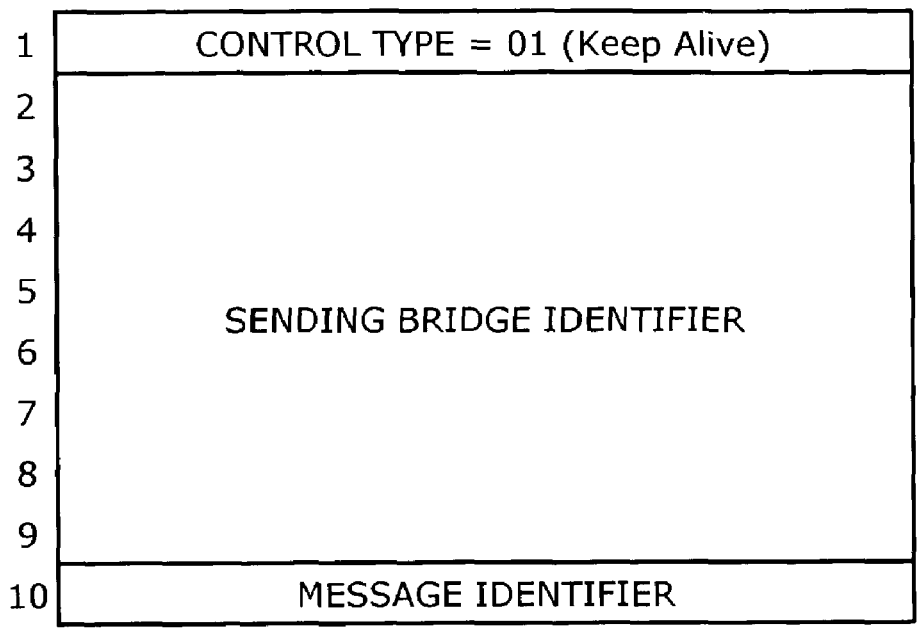
FIG. 29(A) shows a Keep-Alive message.
Figure 29B:
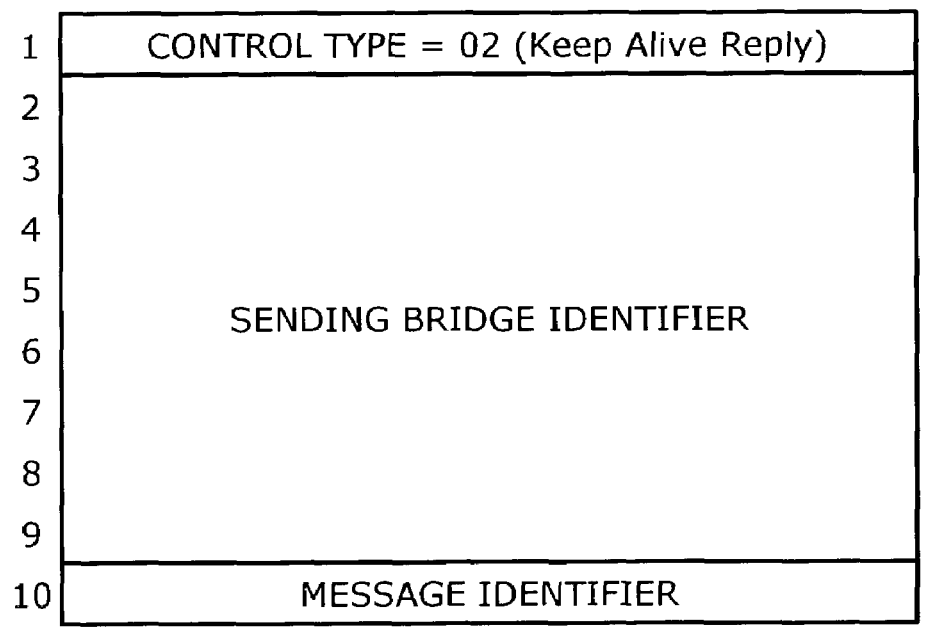
FIG. 29(B) shows a Keep-Alive Reply message.
Figure 30:
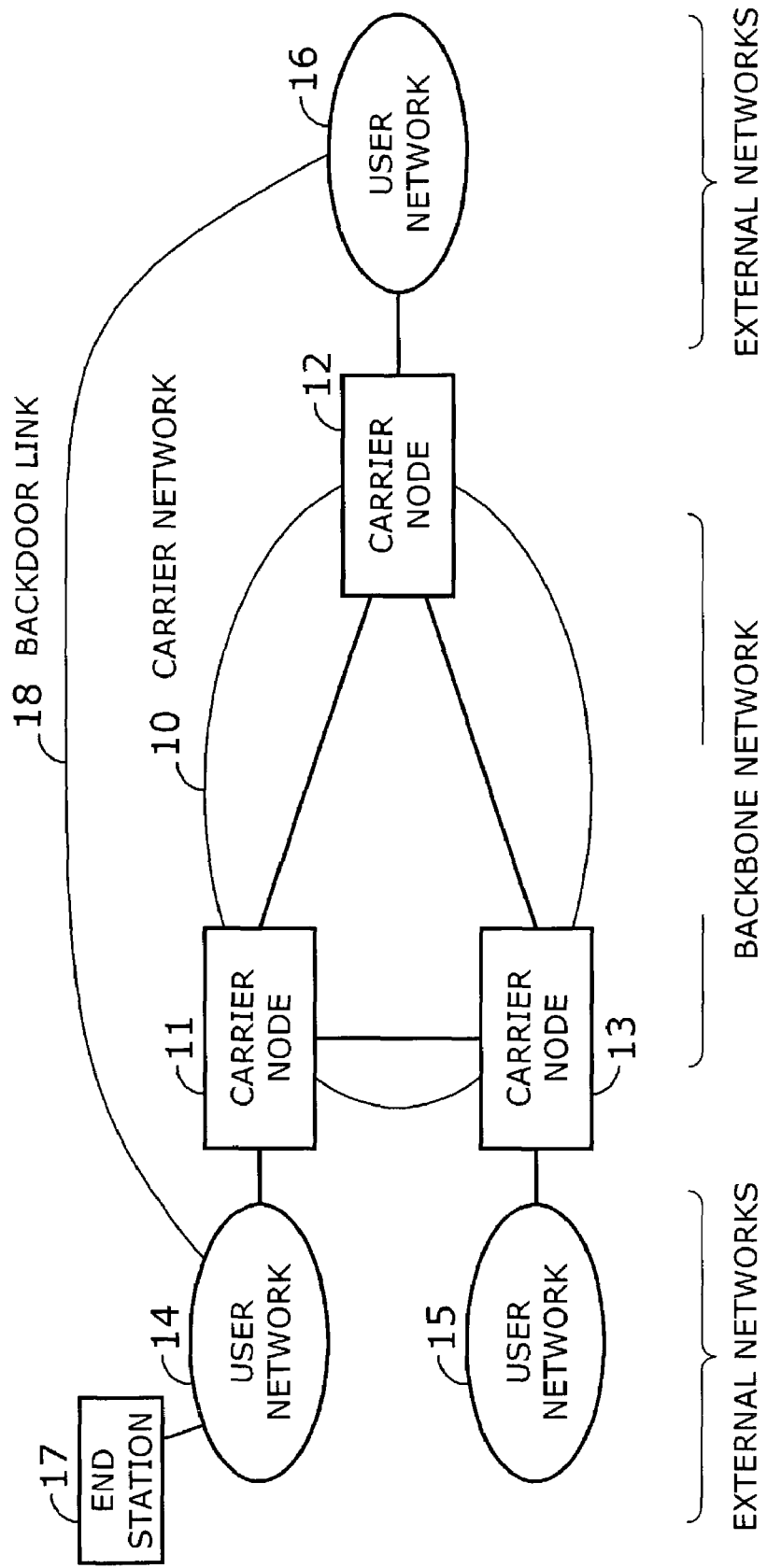
FIG. 30 shows a typical configuration of a conventional frame forwarding system.
Figure 31:
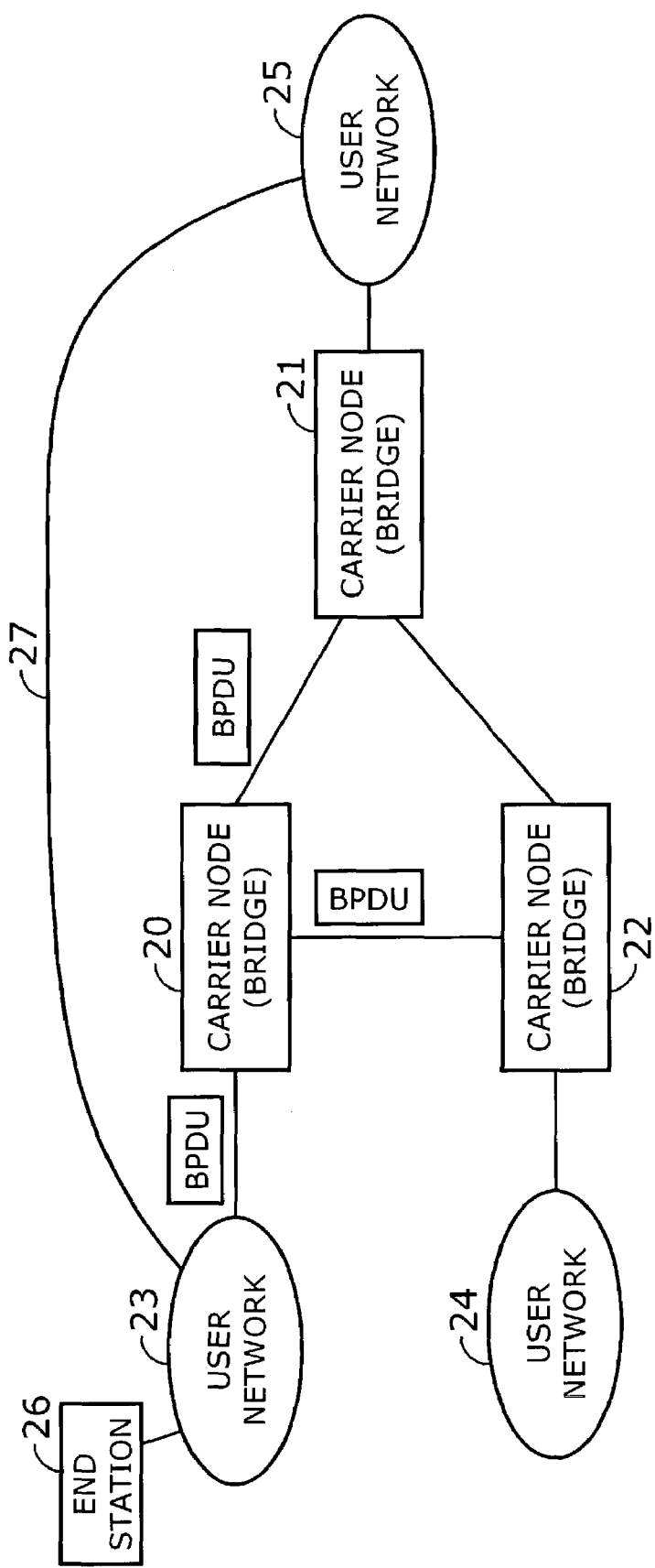
FIG. 31 shows a conventional frame forwarding system where STP BPDUs are sent over bridge-to-bridge links.
Figure 32:
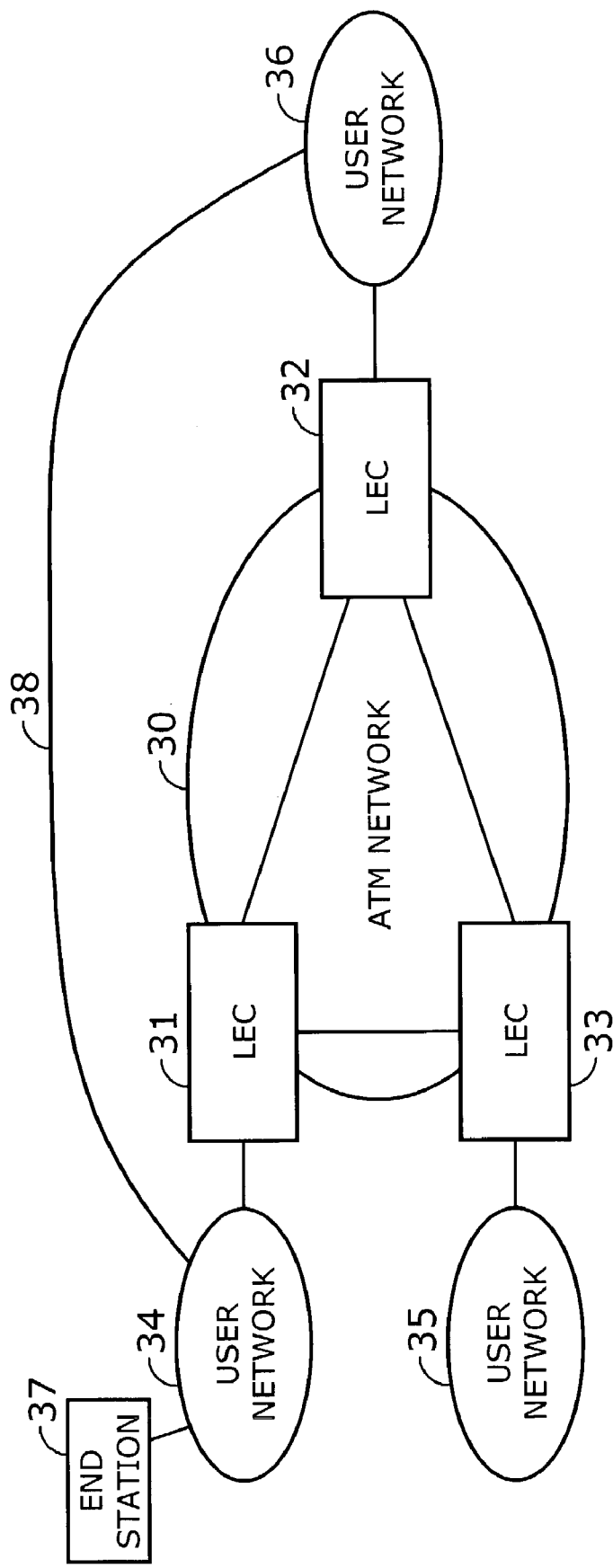
FIG. 32 shows a conventional LAN emulation system where STP BPDUs are sent over an ATM backbone.

FIG. 29(A) shows a Keep-Alive message, and FIG. 29(B) shows a Keep-Alive Reply message. As can be seen from those diagrams, the two messages have the same format, except that they carry different control type field values. That is, their first octet, or "Control Type" field, contains a value of 0x0001 for Keep-Alive messages and 0x0002 for Keep-Alive Reply messages. The sending node sets either value in this "Control Type" field, depending on which message it is sending. The second to ninth octets are used as "Sending Bridge Identifier" field to carry a bridge identifier indicating the sending node. The sending node fills this field with its own bridge identifier. The tenth octet is referred to as the "Message Identifier" field, which distinguishes the present message from others. This field is necessary because each node produces messages repetitively at predetermined intervals. A node generates and sets a new message identifier each time it sends a Keep-Alive message. The receiving node, on the other hand, copies the message identifier of the received Keep-Alive message to the "Message Identifier" field of a Keep-Alive Reply message to be sent back.

The above keep-alive mechanism can also be employed in the third embodiment of the present invention. That is, the link monitor 105b in the server 105 periodically sends a Keep-Alive message to the nodes that serve a particular group of external networks, using its inter-node connection ports corresponding to the external network ports. Upon receipt of a Keep-Alive message on one of its inter-node connection ports, the link monitor 101g in each receiving node responds to the server 105, returning a reply message out the same inter-node connection port. The link monitor 105*b* in the server 105, on the other hand, waits for a reply message from the nodes, and if there was no reply in a predetermined period from a particular node, it would generate an alarm to indicate that the inter-node connection path to that node is lost.

Just as the server 105 periodically sends Keep-Alive messages to nodes, so do the nodes to the server 105, using their link monitor 101*g* and inter-node communication processor 101*f*. The link monitor 105*b* in the server 105 responds to each Keep-Alive message arriving on its inter-node connection port by returning a reply message out the same inter-node connection port. The server 105 carries out transmission and reception of such messages with its inter-node communication processor 105*a*. The link monitor 101*g* in the sending node waits for a Keep-Alive Reply message from the server 105. If there was no reply in a predetermined period, it would generate an alarm to indicate that its inter-node connection path to the server 105 is lost.

The first to third embodiments have been described above with reference to their respective block diagrams. The configurations shown in those diagrams are only examples, and it is not intended to limit the invention to the specific structures shown in them. While the above-described first to third embodiments assume the use of bridges as network devices that forward packets, the present invention should not be limited to that kind of network devices. The present invention is also applicable to other networks constructed with, for example, switches. In other words, the term "frame forwarding device" is used as a generic name throughout the specification to refer to "bridge" or "switch" or any other similar network devices known by those skilled in the art.

The above discussion is summarized as follows. According to the present invention, the proposed frame forwarding system is designed to avoid degradation of network throughput by ensuring the use of backbone links even when there is a backdoor link that forms a potential loop in the network. To make this possible, it employs a system state sharing unit in every frame forwarding device so that the same system state information be shared among the devices. By so doing, all the frame forwarding devices and inter-node links will behave as a single virtual device for forwarding frames between external networks that belong to a particular group. A frame forwarding processor forwards received frames according to the system state information shared among all the frame forwarding devices in the system. When a given STP BPDU necessitates a change in the system state information, a system state updating unit updates the system state information managed in the system state sharing unit.

In one network system, the proposed frame forwarding system is used as an intermediary network that connects a plurality of LAN segments together, without forming a logical loop in the network system. This network system has a mechanism that makes the whole intermediary network behave as a virtual bridge device. The network system also has a function to prevent a logical loop from being formed on a physical loop in the network system, while ensuring the use of logical paths on the intermediary network.

Further, in an intermediary network that interconnects a plurality of LAN segments to form a network system, each edge network device has a function to forward an incoming frame to other network devices on the same intermediary network when it contains information for detecting a physical loop on the network system and avoiding loop traffic on that physical loop. The edge device also has a function to prevent a logical loop from being formed on the physical loop, while maintaining logical paths on the intermediary network, based on the information contained in the incoming frame and parameters that characterize the intermediary network as a single virtual bridge device. Any potential loops are thus detected and logically nullified by the above functions.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A frame forwarding system comprising a first bridge network connected to a second bridge network outside the frame forwarding system, the first bridge network comprising:
   a plurality of frame forwarding devices each comprising a logical bridge port connected to the second bridge network and an inter-node connection port, the logical bridge port being managed according to logical port state information;
   a plurality of links that interconnect the plurality of frame forwarding devices through the inter-node connection ports that are set to a forwarding state;
   system state sharing means, disposed in each frame forwarding device, for producing and sending a control message to other frame forwarding devices on the first bridge network in response to a spanning tree protocol (STP) bridge protocol data unit (BPDU) received from the second bridge network, the control message containing, in addition to the received STP BPDU, a logical bridge port number indicating the logical bridge port through which the frame has been received;
   frame forwarding means, disposed in each frame forwarding device, for forwarding data frames received from the second bridge network according to the logical port state information corresponding to the logical bridge port through which the data frames have been received; and
   system state updating means, disposed in each frame forwarding device, for updating the logical port state information according to the logical bridge port number and STP BPDU received as part of the control message from other frame forwarding devices on the first bridge network, while maintaining the forwarding state of the inter-node connection ports.

2. The frame forwarding system according to claim 1, further comprising connectivity testing means, disposed in each frame forwarding device, for testing connectivity with other frame forwarding devices by sending a predefined message at predetermined intervals and checking whether the other frame forwarding devices respond to the predefined message.

3. A frame forwarding system comprising a first bridge network connected to a second bridge network outside the frame forwarding system, the first bridge network comprising:
   a plurality of frame forwarding devices each comprising a logical bridge port connected to the second bridge network and an inter-node connection port;
   a plurality of links that interconnect the plurality of frame forwarding devices through the inter-node connection ports that are set to a forwarding state;
   a server that manages logical port state information to control the logical bridge ports of the frame forwarding devices in a centralized manner;
   system state sharing means, disposed in each frame forwarding device, for producing and sending a control message to the server in response to a spanning tree protocol (STP) bridge protocol data unit (BPDU) received from the second bridge network, the control message containing, in addition to the received STP BPDU, a logical bridge port number indicating the logical bridge port through which the frame has been received;

system state updating means, disposed in the server, for updating the logical port state information according to the logical bridge port number and STP BPDU received as part of the control message from the system state sharing means while maintaining the forwarding state of the inter-node connection ports, and sending the frame forwarding devices a port control message containing the updated logical port state information; and frame forwarding means, disposed in each frame forwarding device, for forwarding data frames received from the second bridge network according to the logical port state information corresponding to the logical bridge port through which the data frames have been received, the logical port state information having been received as part of the port control message from the server.

4. The frame forwarding system according to claim 1, wherein the server further comprises connectivity testing means for testing connectivity between the server and the frame forwarding devices by sending a predefined message at predetermined intervals and checking whether the frame forwarding devices respond to the predefined message.

5. A frame forwarding device for use as a node in a first bridge network connected to a second bridge network, the frame forwarding device comprising:

a logical bridge port connected to the second bridge network, the logical bridge port being managed according to logical port state information;

an inter-node connection port connected to another frame forwarding device on the first bridge network, the inter-node connection port being set to a forwarding state;

system state sharing means for producing and sending a control message to other frame forwarding devices on the first bridge network in response to a spanning tree protocol (STP) bridge protocol data unit (BPDU) received from the second bridge network, the control message containing, in addition to the received STP BPDU, a logical bridge port number indicating the logical bridge port through which the frame has been received;

system state updating means for updating the logical port state information according to the logical bridge port number and STP BPDU received as part of the control message from other frame forwarding devices on the first bridge network, while maintaining the forwarding state of the inter-node connection port; and frame forwarding means for forwarding data frames received from the second bridge network according to the logical port state information corresponding to the logical bridge port through which the data frames have been received.

* * * * *